United States Patent
Nakamura

(10) Patent No.: US 12,363,453 B2
(45) Date of Patent: Jul. 15, 2025

(54) IMAGING DEVICE

(71) Applicant: SONY SEMICONDUCTOR SOLUTIONS CORPORATION, Kanagawa (JP)

(72) Inventor: Shunya Nakamura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 220 days.

(21) Appl. No.: 18/001,883

(22) PCT Filed: May 13, 2021

(86) PCT No.: PCT/JP2021/018147
§ 371 (c)(1),
(2) Date: Dec. 15, 2022

(87) PCT Pub. No.: WO2021/261104
PCT Pub. Date: Dec. 30, 2021

(65) Prior Publication Data
US 2023/0239587 A1  Jul. 27, 2023

(30) Foreign Application Priority Data

Jun. 23, 2020 (JP) ................. 2020-108112

(51) Int. Cl.
H04N 25/40 (2023.01)
H04N 25/47 (2023.01)
H04N 25/701 (2023.01)

(52) U.S. Cl.
CPC ............. *H04N 25/41* (2023.01); *H04N 25/47* (2023.01); *H04N 25/701* (2023.01)

(58) Field of Classification Search
CPC ....... H04N 25/41; H04N 25/47; H04N 25/701
See application file for complete search history.

(56) References Cited

U.S. PATENT DOCUMENTS

2010/0046853 A1  2/2010 Goodnough et al.
2018/0124335 A1*  5/2018 Machida ................ H04N 25/79

FOREIGN PATENT DOCUMENTS

JP  2016-092661 A  5/2016
JP  2018-006874 A  1/2018
(Continued)

OTHER PUBLICATIONS

International Search Report and Written Opinion of PCT Application No. PCT/JP2021/018147, issued on Jul. 13, 2021, 10 pages of ISRWO.

*Primary Examiner* — Jonathan R Messmore
(74) *Attorney, Agent, or Firm* — CHIP LAW GROUP

(57) ABSTRACT

An imaging device according to an embodiment of the present disclosure includes: a pixel array; and a sensitivity setting section. The pixel array includes a plurality of light-receiving pixels that is divided into a plurality of pixel lines. The plurality of pixel lines includes a first pixel line and a second pixel line that extend in a first direction and are provided side by side in a second direction. The plurality of light-receiving pixels each accumulates electric charge corresponding to an amount of received light and each has light-receiving sensitivity which is variable. The sensitivity setting section sets the light-receiving sensitivity of a second light-receiving pixel in a first period on the basis of a first pixel value corresponding to a result of accumulation in a first light-receiving pixel disposed at a first position in the first pixel line in the first direction. The second light-receiving pixel is disposed at the first position in the second pixel line in the first direction.

8 Claims, 13 Drawing Sheets

(56) References Cited

FOREIGN PATENT DOCUMENTS

| | | |
|---|---|---|
| JP | 2018-078394 A | 5/2018 |
| WO | 2017/169216 A1 | 10/2017 |

* cited by examiner

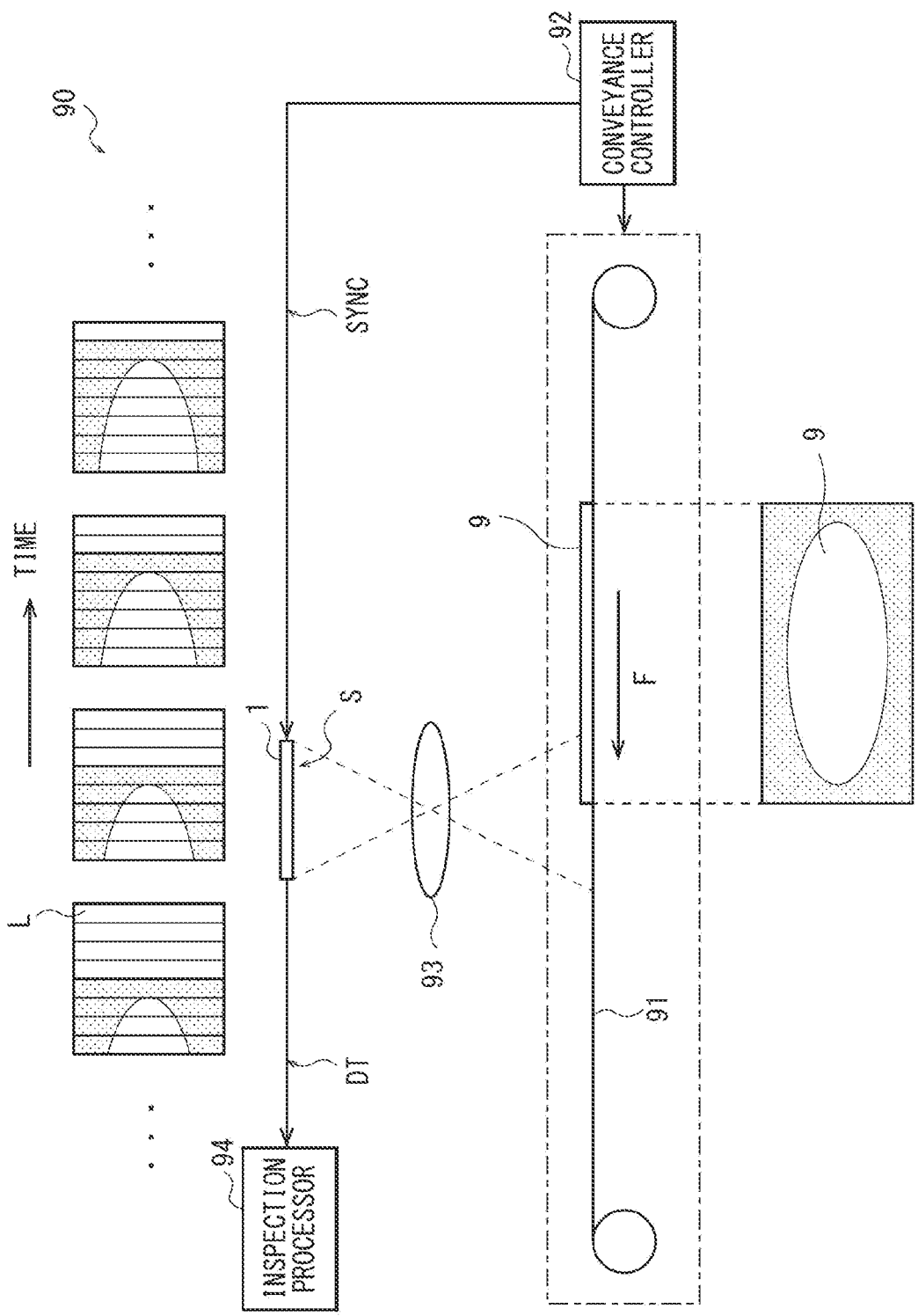
[FIG. 1]

[FIG. 2]
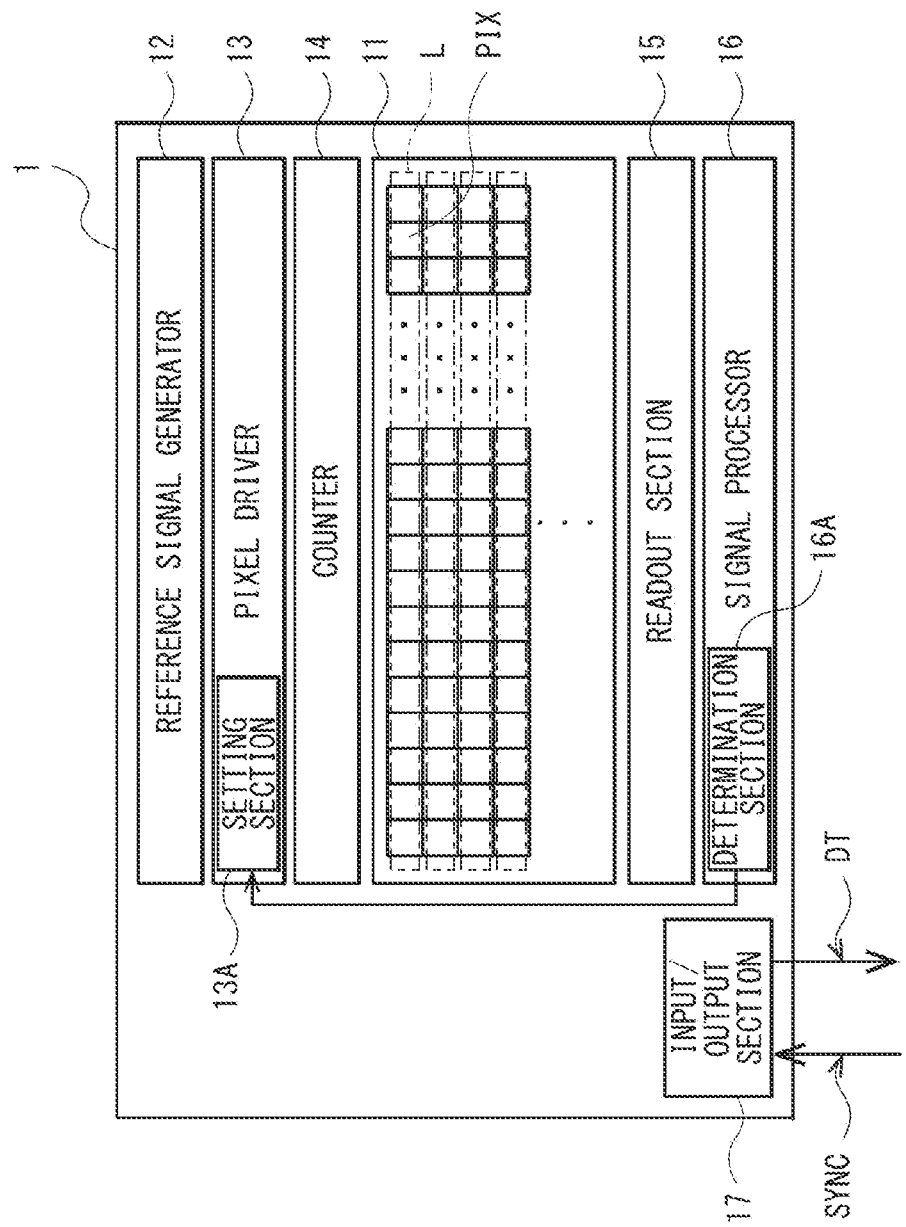

[FIG. 3]
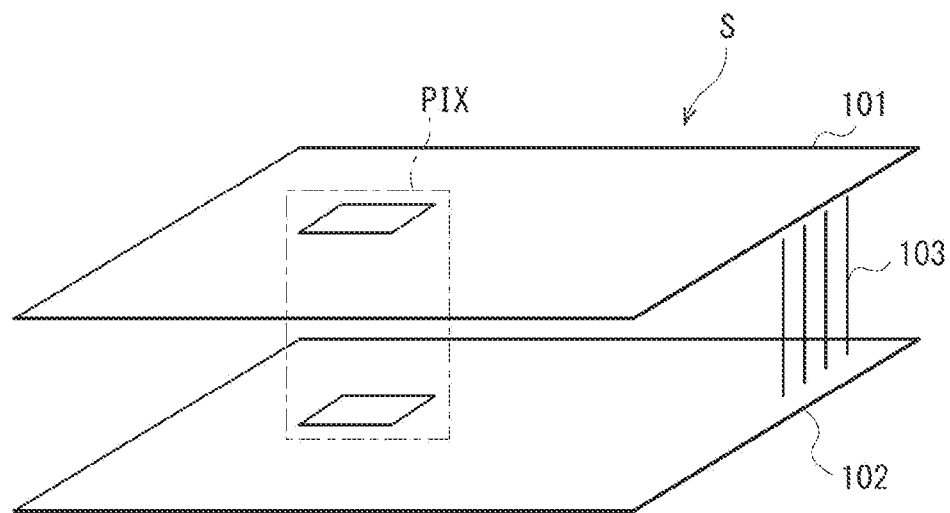

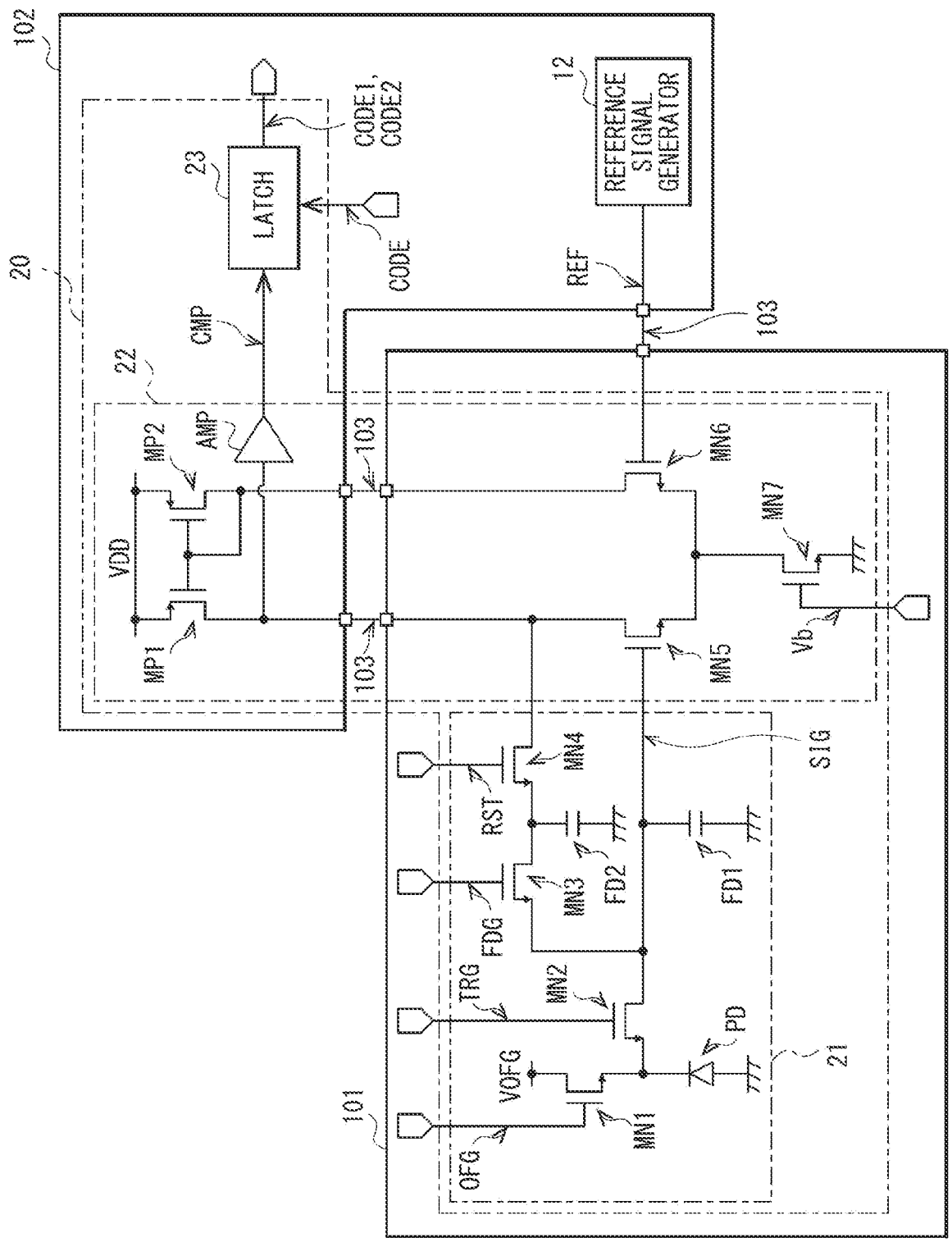
[FIG. 4]

[FIG. 5]
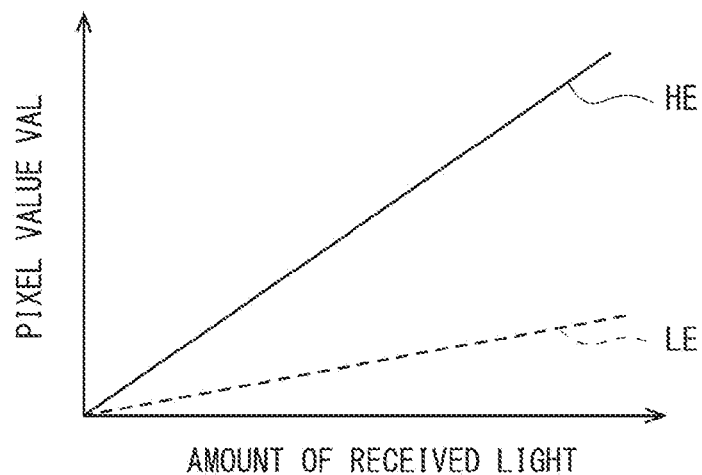
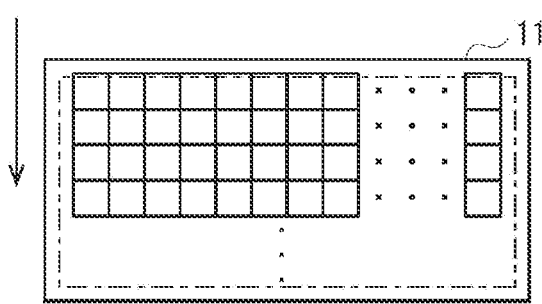
[FIG. 6A]
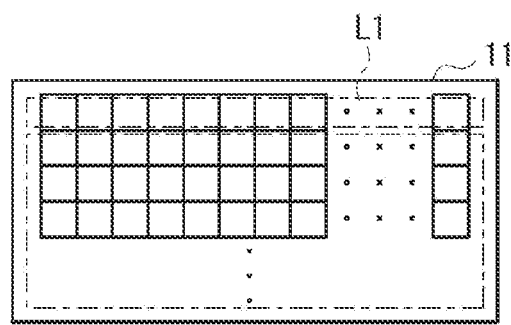
[FIG. 6B]

[FIG. 7]
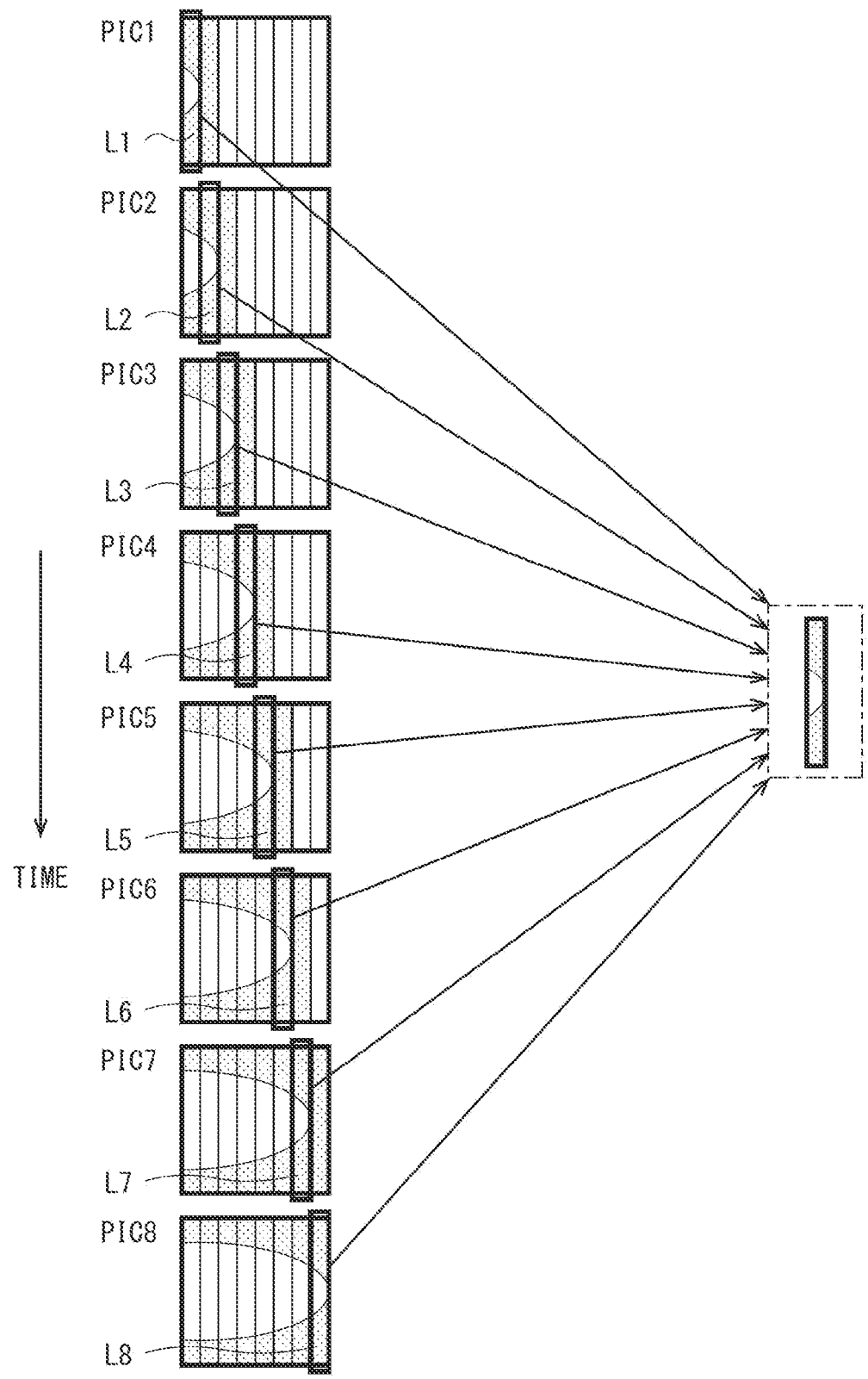

[FIG. 8]
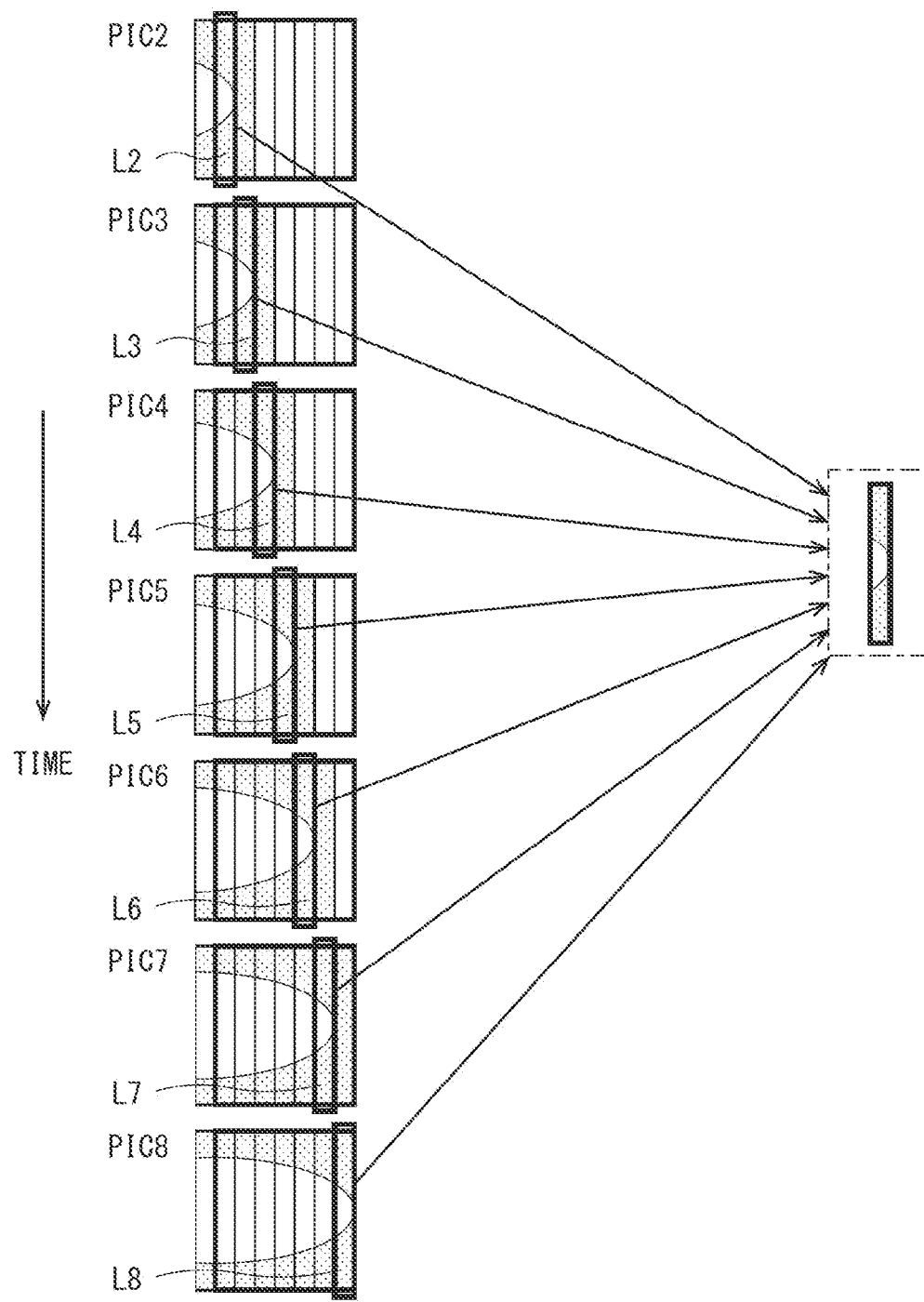

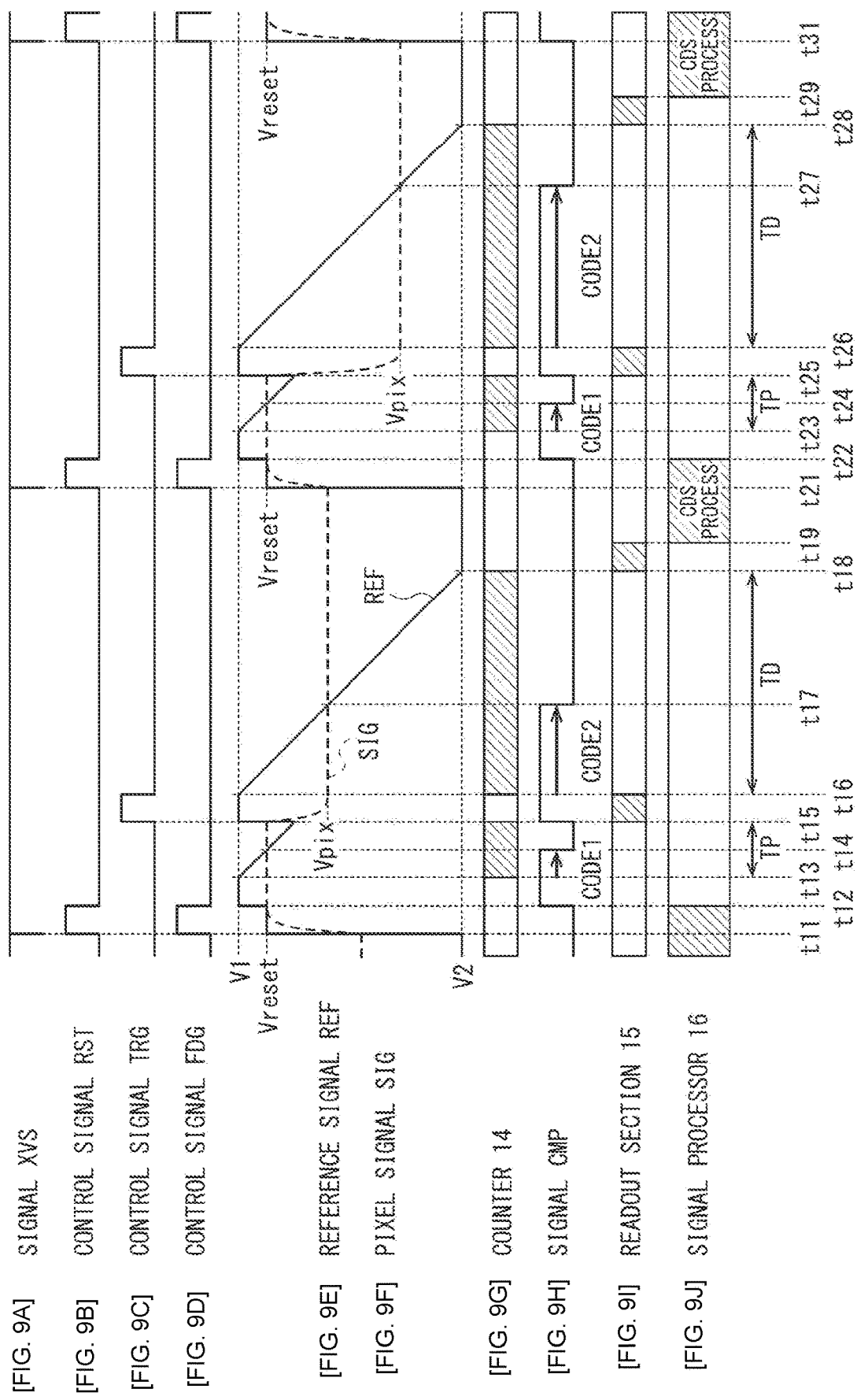

[FIG. 10A]
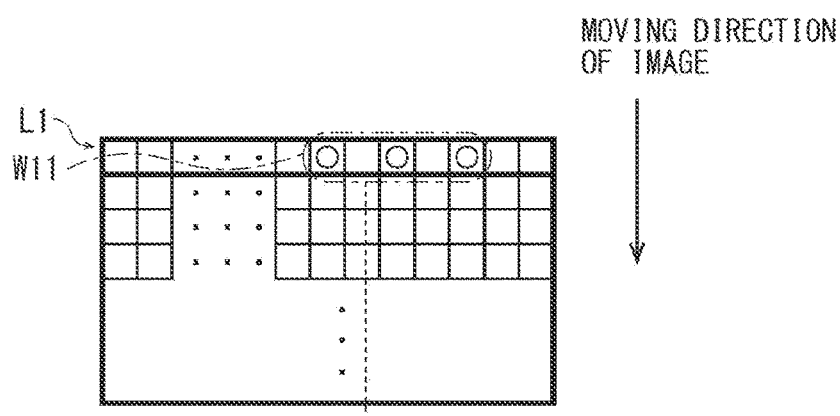
[FIG. 10B]
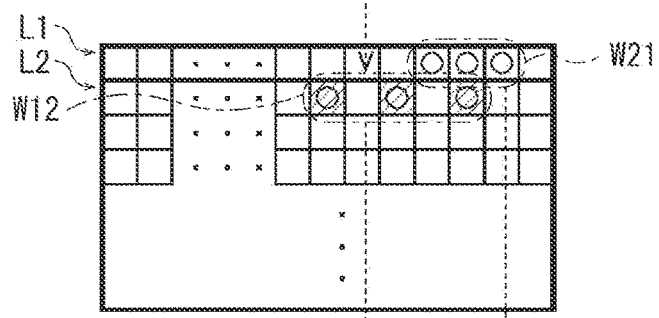
[FIG. 10C]
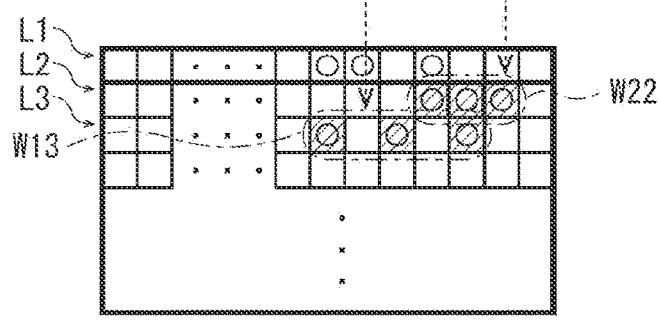

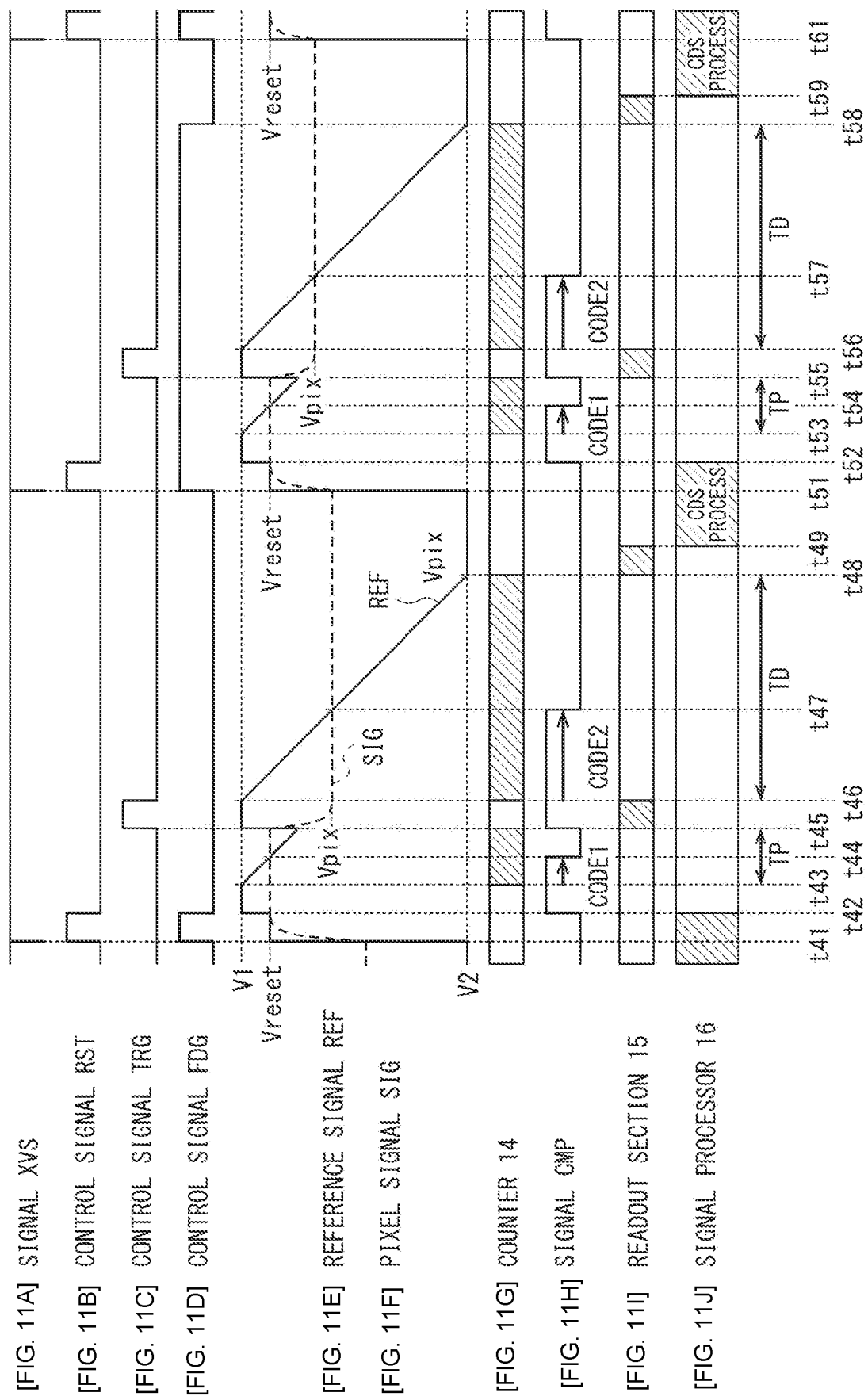

[FIG. 12]
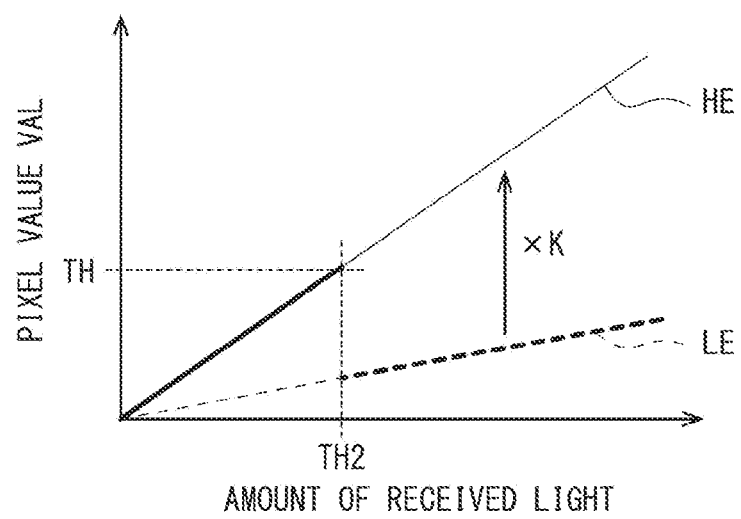

[FIG. 13]
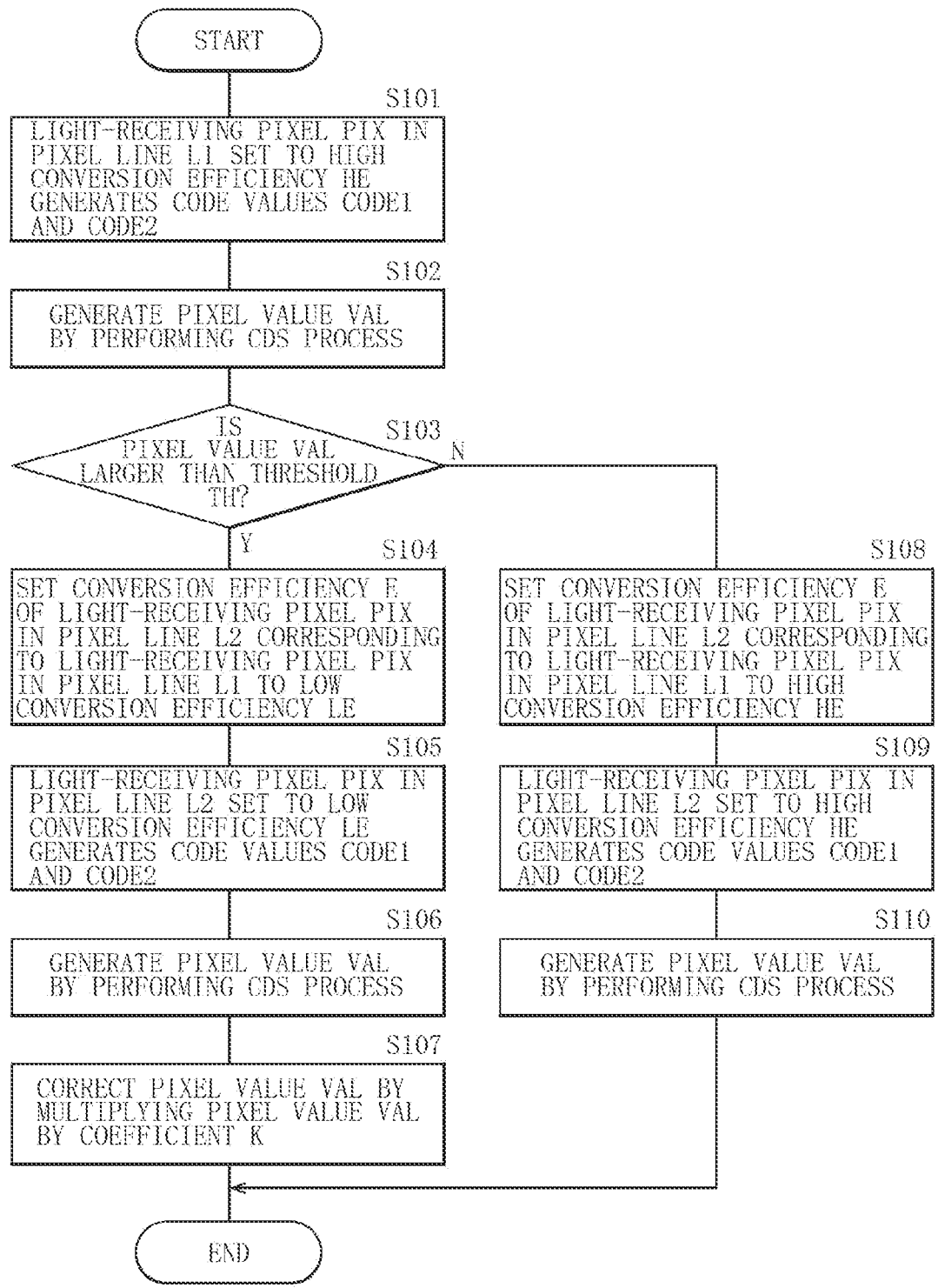

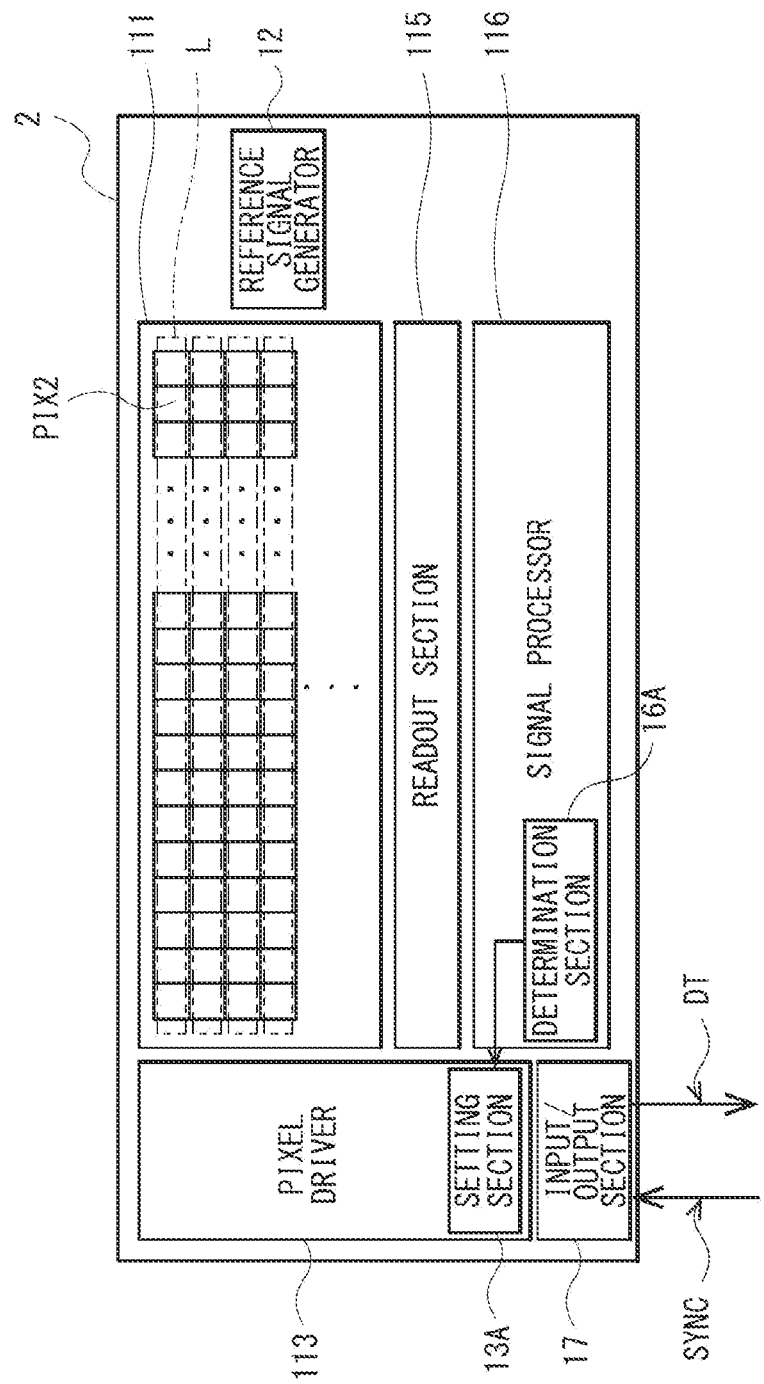
[FIG. 14]

IMAGING DEVICE

CROSS REFERENCE TO RELATED APPLICATIONS

This application is a U.S. National Phase of International Patent Application No. PCT/JP2021/018147 filed on May 13, 2021, which claims priority benefit of Japanese Patent Application No. JP 2020-108112 filed in the Japan Patent Office on Jun. 23, 2020. Each of the above-referenced applications is hereby incorporated herein by reference in its entirety.

TECHNICAL FIELD

The present disclosure relates to an imaging device that images an object.

BACKGROUND ART

An imaging device is often requested to have a wide dynamic range. For example, PTL 1 discloses an imaging device that has variable conversion efficiency for converting electric charge generated by a photodiode into a voltage signal.

CITATION LIST

Patent Literature

PTL 1: Japanese Unexamined Patent Application Publication No. 2016-92661

SUMMARY OF THE INVENTION

An imaging device is requested to have such a wide dynamic range and expected to have a further improved dynamic range.

It is desirable to provide an imaging device that is allowed to have a wider dynamic range.

An imaging device according to an embodiment of the present disclosure includes a pixel array and a sensitivity setting section. The pixel array includes a plurality of light-receiving pixels that is divided into a plurality of pixel lines. The plurality of pixel lines includes a first pixel line and a second pixel line that extend in a first direction and are provided side by side in a second direction. The plurality of light-receiving pixels each accumulates electric charge corresponding to an amount of received light and each has light-receiving sensitivity which is variable. The sensitivity setting section is configured to set the light-receiving sensitivity of a second light-receiving pixel in a first period on the basis of a first pixel value corresponding to a result of accumulation in a first light-receiving pixel disposed at a first position in the first pixel line in the first direction. The second light-receiving pixel is disposed at the first position in the second pixel line in the first direction.

In the imaging device according to the embodiment of the present disclosure, the electric charge corresponding to the amount of received light is accumulated in each of the plurality of light-receiving pixels that each has light-receiving sensitivity which is variable. The plurality of these light-receiving pixels is divided into the plurality of pixel lines including the first pixel line and the second pixel line. The first pixel line and the second pixel line extend in the first direction and are provided side by side in the second direction. The sensitivity setting section then sets the light-receiving sensitivity of the second light-receiving pixel in the first period on the basis of the first pixel value corresponding to the result of the accumulation in the first light-receiving pixel disposed at the first position in the first pixel line in the first direction. The second light-receiving pixel is disposed at the first position in the second pixel line in the first direction.

BRIEF DESCRIPTION OF DRAWING

FIG. 1 is an explanatory diagram illustrating a configuration example of an inspection system including an imaging device according to an embodiment of the present disclosure.

FIG. 2 is a block diagram illustrating a configuration example of the imaging device illustrated in FIG. 1.

FIG. 3 is an explanatory diagram illustrating an implementation example of the imaging device illustrated in FIG. 2.

FIG. 4 is a circuit diagram illustrating a configuration example of a light-receiving pixel illustrated in FIG. 2.

FIG. 5 is an explanatory diagram illustrating an example of conversion efficiency of the light-receiving pixel illustrated in FIG. 4.

FIGS. 6A and 6B are explanatory diagrams illustrating an example of two operation modes of the imaging device illustrated in FIG. 2.

FIG. 7 is an explanatory diagram illustrating an example of a TDI process of a signal processor illustrated in FIG. 2 in a first operation mode.

FIG. 8 is an explanatory diagram illustrating an example of a TDI process of the signal processor illustrated in FIG. 2 in a second operation mode.

FIGS. 9A, 9B, 9C, 9D, 9E, 9F, 9G, 9H, 9I, and 9J are timing waveform chart illustrating an example of an operation of the imaging device illustrated in FIG. 2 in the first operation mode.

FIGS. 10A, 10B, and 10C is an are explanatory diagrams illustrating an operation example of a setting section illustrated in FIG. 2.

FIGS. 11A, 11B, 11C, 11D, 11E, 11F, 11G, 11H, 11I, and 11J are timing waveform chart illustrating an example of an operation of the imaging device illustrated in FIG. 2 in the second operation mode.

MODES FOR CARRYING OUT THE INVENTION

The following describes an embodiment of the present disclosure in detail with reference to the drawings.

Embodiment

Configuration Example

FIG. 1 illustrates a configuration example of an inspection system 90 in which an imaging device (imaging device 1) according to an embodiment is used. The inspection system 90 is configured to image an industrial product being conveyed, for example, by a belt conveyor and inspect the industrial product by using a resultant image. The inspection system 90 includes a belt conveyor 91, a conveyance controller 92, a lens system 93, the imaging device 1, and an inspection processor 94.

The belt conveyor 91 is configured to convey an industrial product to be inspected along a conveyance direction F. This industrial product is an object 9 that is imaged by the imaging device 1.

The conveyance controller 92 is configured to control a conveyance operation of this belt conveyor 91. In addition, the conveyance controller 92 generates a synchronization signal SYNC corresponding to the conveyance speed of the belt conveyor 91. This synchronization signal SYNC has a plurality of pulses disposed at the intervals corresponding to the conveyance speed. In this example, the pitch of these pulses is set to be the same time as the time in which an image of the object 9 advances on an imaging surface S of the imaging device 1 by one pixel line L as described below. The conveyance controller 92 then supplies this synchronization signal SYNC to the imaging device 1.

The lens system 93 is configured to guide the image of the object 9 to the imaging surface S of the imaging device 1. The lens system 93 is a Keplerian system in this example.

The imaging device 1 is a linear sensor. The imaging device 1 is configured to image, through the lens system 93, the object 9 being conveyed by the belt conveyor 91. In this example, the lens system 93 is a Keplerian system. As illustrated in FIG. 1, the object 9 thus moves on the imaging surface S of the imaging device 1 in the direction opposite to the conveyance direction F. The imaging device 1 performs an imaging operation in response to each of the plurality of pulses included in the synchronization signal SYNC. The imaging device 1 includes the plurality of pixel lines L. In this example, the imaging device 1 performs an imaging operation on the basis of the synchronization signal SYNC whenever the image of the object 9 advances on the imaging surface S by the one pixel line L. The imaging device 1 then supplies image data DT indicating an imaging result to the inspection processor 94.

The inspection processor 94 is configured to inspect the industrial product (object 9) on the basis of the image data DT supplied from the imaging device 1.

FIG. 2 illustrates a configuration example of the imaging device 1. The imaging device 1 includes a pixel array 11, a reference signal generator 12, a pixel driver 13, a counter 14, a readout section 15, a signal processor 16, and an input/output section 17.

The pixel array 11 includes a plurality of light-receiving pixels PIX disposed in a matrix. The plurality of light-receiving pixels PIX is divided into the plurality of pixel lines L. In FIG. 2, the pixel lines L extend in the horizontal direction and are provided side by side in the vertical direction. The direction (vertical direction) in which the pixel lines L are provided side by side is a direction in which an image of the object 9 moves. Each of the plurality of pixel lines L includes a predetermined number of light-receiving pixels PIX. Each of the light-receiving pixels PIX is configured to perform an accumulation operation of accumulating electric charge corresponding to the amount of received light in an accumulation period and perform an AD (Analog to Digital) conversion operation of converting an analog signal corresponding to the electric charge accumulated in the accumulation period into a digital value. The light-receiving pixels PIX are disposed over two semiconductor substrates.

FIG. 3 illustrates an implementation example of the imaging device 1. In this example, the imaging device 1 is formed on two semiconductor substrates 101 and 102. The semiconductor substrate 101 is disposed on the imaging surface side of the imaging device 1 and the semiconductor substrate 102 is disposed on the opposite side to the imaging surface side of the imaging device 1. The semiconductor substrates 101 and 102 are superimposed. A wiring line of the semiconductor substrate 101 and a wiring line of the semiconductor substrate 102 are coupled by a wiring line 103. It is possible to use, for example, a metallic bond or the like such as Cu—Cu for the wiring line 103. The light-receiving pixels PIX are disposed over these two semiconductor substrates 101 and 102.

FIG. 4 illustrates a configuration example of the light-receiving pixel PIX. The light-receiving pixel PIX includes a pixel circuit 20. The pixel circuit 20 includes a light-receiving circuit 21, a comparison circuit 22, and a latch 23.

The light-receiving circuit 21 is configured to generate a pixel voltage Vpix corresponding to the amount of received light. The light-receiving circuit 21 is disposed on the semiconductor substrate 101. The light-receiving circuit 21 includes a photodiode PD, transistors MN1 and MN2, a floating diffusion FD1, a transistor MN3, a floating diffusion FD2, and a transistor MN4. The transistors MN1 to MN4 are N-type MOS (Metal Oxide Semiconductor) transistors.

The photodiode PD is a photoelectric conversion element that generates an amount of electric charge corresponding to the amount of received light and accumulates the electric charge therein. The anode of the photodiode PD is grounded and the cathode thereof is coupled to the sources of the transistors MN1 and MN2.

The gate of the transistor MN1 is supplied with a control signal OFG supplied from the pixel driver 13 (FIG. 2), the drain thereof is supplied with a voltage VOFG, and the source thereof is coupled to the cathode of the photodiode PD and the source of the transistor MN2.

The gate of the transistor MN2 is supplied with a control signal TRG supplied from the pixel driver 13 (FIG. 2), the source thereof is coupled to the cathode of the photodiode PD and the source of the transistor MN1, and the drain thereof is coupled to the floating diffusion FD1, the source of the transistor MN3, and the gate of a transistor MN5 (described below) in the comparison circuit 22.

The floating diffusion FD1 is configured to accumulate electric charge transferred from the photodiode PD. The floating diffusion FD1 includes, for example, a diffusion layer formed on a surface of the semiconductor substrate 101. FIG. 4 illustrates the floating diffusion FD1 by using the symbol of a capacitor.

The gate of the transistor MN3 is supplied with a control signal FDG supplied from the pixel driver 13 (FIG. 2), the source thereof is coupled to the drain of the transistor MN2, the floating diffusion FD1, and the gate of the transistor MN5 (described below) in the comparison circuit 22, and the drain thereof is coupled to the floating diffusion FD2 and the source of the transistor MN4.

The floating diffusion FD2 is configured to accumulate electric charge transferred from the photodiode PD as with the floating diffusion FD1. The floating diffusion FD2 includes, for example, a diffusion layer formed on a surface of the semiconductor substrate 101. FIG. 4 illustrates the floating diffusion FD2 by using the symbol of a capacitor.

The gate of the transistor MN4 is supplied with a control signal RST supplied from the pixel driver 13 (FIG. 2), the source thereof is coupled to the floating diffusion FD2 and the drain of the transistor MN3, and the drain thereof is coupled to the drain of the transistor MN5 (described below) of the comparison circuit 22.

This configuration causes the light-receiving circuit 21 to discharge the electric charge accumulated in the photodiode PD by turning on the transistor MN1 on the basis of the control signal OFG. The transistor MN1 is then turned off to start the accumulation period and an amount of electric charge corresponding to the amount of received light is accumulated in the photodiode PD. Then, after the accumulation period ends, the light-receiving circuit 21 supplies a pixel signal SIG to the comparison circuit 22. The pixel signal SIG includes a reset voltage Vreset and the pixel voltage Vpix. Specifically, as described below, in a P-phase (Pre-charge phase) period TP after the voltage of the floating diffusion FD1 or FD2 is reset, the light-receiving circuit 21 supplies the reset voltage of the floating diffusion FD1 or FD2 at that time as the voltage Vreset to the comparison circuit 22. In addition, in a D-phase (Data phase) period TD after the electric charge is transferred from the photodiode PD to the floating diffusion FD, which is one of the floating diffusion FD1 or FD2 to be used, the light-receiving circuit 21 supplies the voltage of the floating diffusion FD at that time as the pixel voltage Vpix to the comparison circuit 22.

The light-receiving pixel PIX is configured to have variable conversion efficiency E for converting the electric charge corresponding to the amount of received light into the pixel voltage Vpix. In this example, the conversion efficiency E is set to one of two conversion efficiencies E (high conversion efficiency HE and low conversion efficiency LE). In a case where the conversion efficiency E is set to the high conversion efficiency HE, the transistor MN3 is set off. This causes the one floating diffusion FD1 to convert the electric charge supplied from the photodiode PD into the pixel voltage Vpix. In a case where the conversion efficiency E is set to the low conversion efficiency LE, the transistor MN3 is set on. This causes the two floating diffusions FD1 and FD2 to convert the electric charge supplied from the photodiode PD into the pixel voltage Vpix. The total capacitance value of the two floating diffusions FD1 and FD2 is larger than the capacitance value of the one floating diffusion FD1. The conversion efficiency E (low conversion efficiency LE) for the two floating diffusions FD1 and FD2 to convert electric charge into the pixel voltage Vpix is therefore lower than the conversion efficiency E (high conversion efficiency HE) for the one floating diffusion FD1 to convert electric charge into the pixel voltage Vpix.

FIG. 5 illustrates an example of a conversion characteristic E of the light-receiving pixel PIX. The horizontal axis represents the amount of received light in the accumulation period and the vertical axis represents a pixel value VAL obtained on the basis of the electric charge accumulated in the accumulation period. As illustrated in FIG. 5, the pixel value VAL linearly varies in accordance with amount of received light. The pixel value VAL varies at a lower rate in accordance with the amount of received light in a case of the low conversion efficiency LE. The pixel value VAL varies at a higher rate in accordance with the amount of received light in a case of the high conversion efficiency HE.

For example, in a case where the imaging device 1 images a bright portion of the object 9, the imaging device 1 is able to image the bright portion at high image quality by setting the conversion efficiency E of the light-receiving pixel PIX that images the bright portion to the low conversion efficiency LE. In addition, in a case where the imaging device 1 images a dark portion of the object 9, the imaging device 1 is able to image the dark portion at high image quality by setting the conversion efficiency E of the light-receiving pixel PIX that images the dark portion to the high conversion efficiency HE. As a result, the imaging device 1 is allowed to have a widened dynamic range.

The comparison circuit 22 (FIG. 4) is configured to generate a signal CMP by comparing a reference signal REF and the pixel signal SIG. The comparison circuit 22 sets the signal CMP at the high level in a case where the voltage of the reference signal REF is higher than the voltage of the pixel signal SIG. The comparison circuit 22 sets the signal CMP at the low level in a case where the voltage of the reference signal REF is lower than the voltage of the pixel signal SIG. The comparison circuit 22 includes the transistors MN5 to MN7 and transistors MP1 and MP2. The transistors MN5 to MN7 are N-type MOS transistors and the transistors MP1 and MP2 are P-type MOS transistors. The comparison circuit 22 is disposed over the two semiconductor substrates 101 and 102. Specifically, the transistors MN5 to MN7 are disposed on the semiconductor substrate 101 and the transistors MP1 and MP2 are disposed on the semiconductor substrate 102.

The gate of the transistor MN5 is supplied with the pixel signal SIG, the drain thereof is coupled to the drain of the transistor MN4 in the light-receiving circuit 21 and coupled to the drain of the transistor MP1 and the input terminal of an amplifier AMP through the wiring line 103 between the semiconductor substrates 101 and 102, and the source thereof is coupled to the source of the transistor MN6 and the drain of the transistor MN7. The gate of the transistor MN6 is supplied with the reference signal REF from the reference signal generator 12 through the wiring line 103 between the semiconductor substrates 101 and 102, the drain thereof is coupled to the drain of the transistor MP2 and the gates of the transistors MP1 and MP2 through the wiring line 103 between the semiconductor substrates 101 and 102, and the source thereof is coupled to the source of the transistor MN5 and the drain of the transistor MN7. The reference signal REF is a signal that has a so-called ramp waveform in which the voltage level gradually varies with the lapse of time in the P-phase period TP and the D-phase period TD. The gate of the transistor MN7 is supplied with a bias voltage Vb, the drain thereof is coupled to the sources of the transistors MN5 and MN6, and the source thereof is grounded. The transistors MN5 and MN6 configure a differential pair and the transistor MN7 configures a constant current source.

The gate of the transistor MP1 is coupled to the gate and the drain of the transistor MP2 and coupled to the drain of the transistor MN6 through the wiring line 103 between the semiconductor substrates 101 and 102, the source thereof is supplied with a power supply voltage VDD, and the drain thereof is coupled to the input terminal of the amplifier AMP and coupled to the drain of the transistor MN5 and the drain of the transistor MN4 in the light-receiving circuit 21 through the wiring line 103 between the semiconductor substrates 101 and 102. The gate of the transistor MP2 is coupled to the gate of the transistor MP1 and the drain of the transistor MP2 and coupled to the drain of the transistor MN6 through the wiring line 103 between the semiconductor substrates 101 and 102, the source thereof is supplied with the power supply voltage VDD, and the drain thereof is coupled to the gates of the transistors MP1 and MP2 and coupled to the drain of the transistor MN6 through the wiring line 103 between the semiconductor substrates 101 and 102. The transistors MP1 and MP2 configure active loads of the transistors MN5 and MN6.

The input terminal of the amplifier AMP is coupled to the drain of the transistor MP1 and coupled to the drain of the transistor MN5 and the drain of the transistor MN4 in the light-receiving circuit 21 through the wiring line 103 between the semiconductor substrates 101 and 102 and the output terminal thereof is coupled to the latch 23. The comparison circuit 22 outputs the signal CMP from the output terminal of the amplifier AMP.

The latch 23 is configured to latch a time code CODE supplied from the counter 14 (FIG. 2) on the basis of the signal CMP supplied from the comparison circuit 22. The time code CODE varies with the lapse of time. It is possible to use, for example, a Gray code for the time code CODE. As described below, the latch 23 latches the time code CODE at a transition timing of the signal CMP in the P-phase period TP to acquire the time (code value CODE1) from the start of the P-phase period TP to the transition of the signal CMP. In addition, the latch 23 latches the time code CODE at a transition timing of the signal CMP in the D-phase period TD to acquire the time (code value CODE2) from the start of the D-phase period TD to the transition of the signal CMP. The difference (CODE2−CODE1) between these two code values corresponds to the pixel value VAL corresponding to the amount of received light in the accumulation period. The latch 23 then supplies the two code values CODE1 and CODE2 to the signal processor 16 on the basis of a control signal supplied from the readout section 15.

In this way, the pixel circuit 20 generates the pixel signal SIG including the pixel voltage Vpix corresponding to the amount of received light and performs AD conversion on the basis of this pixel signal SIG to generate the code values CODE1 and CODE2.

The imaging device 1 has two operation modes (operation modes M1 and M2). The operation mode M1 is a mode in which the conversion efficiencies E of the plurality of light-receiving pixels PIX of the pixel array 11 are each set to the high conversion efficiency HE. The operation mode M2 is a mode in which the conversion efficiencies E of the plurality of light-receiving pixels PIX of the pixel array 11 are set to one of the high conversion efficiency HE or the low conversion efficiency LE pixel by pixel in accordance with the brightness of a portion of the object 9 to be imaged.

FIGS. 6A and 6B illustrate an operation examples of the pixel array 11. FIG. 6A illustrates an operation in the operation mode M1 and FIG. 6B illustrates an operation in the operation mode M2. In this example, an image of the object 9 moves from top to bottom in FIGS. 6A and 6B. The pixel line L disposed uppermost in the pixel array 11 is thus a most upstream pixel line L1 in FIGS. 6A and 6B.

In the operation mode M1, the imaging device 1 sets each of the conversion efficiencies E of all the light-receiving pixels PIX of the pixel array 11 to the high conversion efficiency HE. The imaging device 1 then generates the image data DT on the basis of the pixel values VAL of all of these light-receiving pixels PIX.

In the operation mode M2, the imaging device 1 sets each of the conversion efficiencies E of the plurality of light-receiving pixels PIX in the most upstream pixel line L1 to the high conversion efficiency HE. On the basis of the pixel values VAL of the plurality of light-receiving pixels PIX in the pixel line L1, the imaging device 1 sets each of the conversion efficiencies E of the plurality of light-receiving pixels PIX in the plurality of other pixel lines L. The imaging device 1 then generates the image data DT on the basis of the pixel values VAL of the plurality of light-receiving pixels PIX in the plurality of pixel lines L other than the pixel line L1. In other words, in the operation mode M2, the most upstream pixel line L1 functions as the pixel line L for determining the conversion efficiencies E of the plurality of light-receiving pixels PIX in the plurality of pixel lines L other than the pixel line L1 and the plurality of pixel lines L other than the pixel line L1 functions as the pixel lines L for generating the image data DT.

The reference signal generator 12 (FIG. 2) is configured to generate the reference signal REF. The reference signal REF has a so-called ramp waveform in which the voltage level gradually varies with the lapse of time in the P-phase period TP and the D-phase period TD. The reference signal generator 12 then supplies the generated reference signal REF to each of the pixel circuits 20 in the plurality of light-receiving pixels PIX. As illustrated in FIG. 4, the reference signal generator 12 is disposed on the semiconductor substrate 102.

The pixel driver 13 is configured to control an operation of each of the pixel circuits 20 in the plurality of light-receiving pixels PIX. Specifically, the pixel driver 13 generates the control signals OFG, TRG, FDG, and RST and supplies these control signals OFG, TRG, FDG, and RST to the light-receiving circuit 21 to control an operation of the pixel circuit 20. The pixel driver 13 is disposed, for example, on the semiconductor substrate 102.

The pixel driver 13 includes a setting section 13A. In the operation mode M1, the setting section 13A sets each of the conversion efficiencies E of the plurality of light-receiving pixels PIX to the high conversion efficiency HE. In addition, in the operation mode M2, the setting section 13A sets each of the conversion efficiencies E of the plurality of light-receiving pixels PIX in the most upstream pixel line L1 to the high conversion efficiency HE and sets each of the conversion efficiencies E of the plurality of light-receiving pixels PIX in the plurality of pixel lines L other than the pixel line L1 on the basis of a result of comparison between the pixel values VAL of the plurality of light-receiving pixels PIX in the pixel line L1 and a threshold TH. The result of comparison is supplied from a determination section 16A of the signal processor 16.

The counter 14 is a Gray code counter in this example. The counter 14 is configured to generate the time code CODE and supply this time code CODE to the latches 23 of the pixel circuits 20 in the plurality of light-receiving pixels PIX. The counter 14 is disposed, for example, on the semiconductor substrate 102.

The readout section 15 is configured to supply the code values CODE1 and CODE2 generated by the respective pixel circuits 20 in the plurality of light-receiving pixels PIX to the signal processor 16 in predetermined order. The readout section 15 is disposed, for example, on the semiconductor substrate 102.

The signal processor 16 is configured to generate the image data DT by performing predetermined image processing on the basis of the code values CODE1 and CODE2 generated by the respective pixel circuits 20 of the plurality of light-receiving pixels PIX. Examples of the predetermined image processing include a CDS process of generating the pixel value VAL by using the principle of correlated double sampling (CDS; Correlated Double Sampling) on the basis of the two code values CODE1 and CODE2 generated by the pixel circuit 20 and a TDI (Time Delay Integration) process in which a process of adding the pixel values VAL is performed on the basis of a plurality of line images.

FIG. 7 illustrates an example of the TDI process in the operation mode M1. FIG. 7 illustrates an example of the TDI process on a line image for the one pixel line L. In this example, the pixel array 11 is provided with the eight pixel lines L for convenience of explanation. In FIG. 7, an image of the object 9 moves from left to right. The pixel line L disposed at the leftmost position is thus the most upstream pixel line L1.

The imaging device 1 sets an accumulation period on the basis of the synchronization signal SYNC whenever the image of the object 9 advances on the imaging surface S by the one pixel line L. This causes the pixel array 11 to generate a plurality of images (eight images PIC1 to PIC8 in this example) on the basis of respective accumulation results in the plurality of accumulation periods that has been sequentially set as illustrated in FIG. 7. In the images PIC1 to PIC8, an image of the object 9 advances in the right direction in FIG. 7 with the lapse of time by using the one pixel line L as a unit. For example, a line image for the pixel line L1 in the image PIC1, a line image for a pixel line L2 in the image PIC2, a line image for a pixel line L3 in the image PIC3, a line image for a pixel line L4 in the image PIC4, a line image for a pixel line L5 in the image PIC5, a line image for a pixel line L6 in the image PIC6, a line image for a pixel line L7 in the image PIC7, and a line image for a pixel line L8 in the image PIC8 are images illustrating the same portion of the object 9.

In the operation mode M1, the signal processor 16 generates the image data DT on the basis of all the pixel lines L in the pixel array 11. In this example, the signal processor 16 performs a TDI process by performing a process of adding the pixel values VAL on the basis of a line image for the most upstream pixel line L1 in the image PIC1, a line image for the second pixel line L2 in the image PIC2, a line image for the pixel line L3 in the image PIC3, a line image for the pixel line L4 in the image PIC4, a line image for the pixel line L5 in the image PIC5, a line image for the pixel line L6 in the image PIC6, a line image for the pixel line L7 in the image PIC7, and a line image for the pixel line L8 in the image PIC8. The description above focuses on the one pixel line L in each of the images PIC1 to PIC8, but the same applies to the other pixel lines L. In this way, the signal processor 16 generates the image data DT in the operation mode M1.

FIG. 8 illustrates an example of the TDI process in the operation mode M2. As described above, in the operation mode M2, the most upstream pixel line L1 functions as the pixel line L for determining the conversion efficiencies E of the plurality of light-receiving pixels PIX in the plurality of pixel lines L other than the pixel line L1 and the plurality of pixel lines L other than the pixel line L1 functions as the pixel lines L for generating the image data DT. In other words, the signal processor 16 generates the image data DT on the basis of the plurality of pixel lines L other than the most upstream pixel line L1 in the pixel array 11. In this example, the signal processor 16 performs a TDI process by performing a process of adding the pixel values VAL on the basis of a line image for the second pixel line L2 in the image PIC2, a line image for the pixel line L3 in the image PIC3, a line image for the pixel line L4 in the image PIC4, a line image for the pixel line L5 in the image PIC5, a line image for the pixel line L6 in the image PIC6, a line image for the pixel line L7 in the image PICT, and a line image for the pixel line L8 in the image PIC5. In this way, the signal processor 16 generates the image data DT in the operation mode M2.

The signal processor 16 includes the determination section 16A. The determination section 16A is configured to compare each of the pixel values VAL of the plurality of light-receiving pixels PIX in the most upstream pixel line L1 with the threshold TH and supply a result of the comparison to the setting section 13A of the pixel driver 13 in the operation mode M2.

In this way, the signal processor 16 generates the image data DT on the basis of the code values CODE1 and CODE2 generated by the plurality of respective pixel circuits 20. The signal processor 16 is disposed, for example, on the semiconductor substrate 102.

The input/output section 17 is configured to receive the synchronization signal SYNC supplied from the conveyance controller 92 (FIG. 1) and output the image data DT generated by the signal processor 16. The input/output section 17 is disposed, for example, on the semiconductor substrate 102.

Here, the pixel array 11 corresponds to a specific example of a "pixel array" according to the present disclosure. The light-receiving pixel PIX corresponds to a specific example of a "light-receiving pixel" according to the present disclosure. The conversion efficiency E corresponds to a specific example of "light-receiving sensitivity" according to the present disclosure. The pixel line L corresponds to a specific example of a "pixel line" according to the present disclosure. The setting section 13A and the determination section 16A each correspond to a specific example of a "sensitivity setting section" according to the present disclosure. The pixel value VAL corresponds to a specific example of a "pixel value" according to the present disclosure. The signal processor 16 corresponds to a specific example of a "signal processor" according to the present disclosure. The image data DT corresponds to a specific example of "image data" according to the present disclosure. The operation mode M1 corresponds to a specific example of a "first operation mode" according to the present disclosure. The operation mode M2 corresponds to a specific example of a "second operation mode" according to the present disclosure.

[Operations and Workings]

Subsequently, the operations and workings of the imaging device 1 according to the present embodiment are described.

(Overview of Overall Operation)

First, an overview of an overall operation of the imaging device 1 is described with reference to FIGS. 1 and 2. The input/output section 17 receives the synchronization signal SYNC from the conveyance controller 92. The reference signal generator 12 generates the reference signal REF. The pixel driver 13 controls an operation of each of the pixel circuits 20 in the plurality of light-receiving pixels PIX. The counter 14 generates the time code CODE. Each of the pixel circuits 20 in the plurality of light-receiving pixels PIX generates the pixel signal SIG including the pixel voltage Vpix corresponding to the amount of received light and generates the code values CODE1 and CODE2 by performing AD conversion with the reference signal REF and the time code CODE on the basis of this pixel signal SIG. The readout section 15 supplies the code values CODE1 and CODE2 generated by the respective pixel circuits 20 in the plurality of light-receiving pixels PIX to the signal processor 16 in predetermined order. The signal processor 16 generates the image data DT by performing predetermined image processing on the basis of the code values CODE1 and CODE2 generated by the plurality of respective pixel circuits 20. The input/output section 17 outputs the image data DT.

(Detailed Operation in Operation Mode M1)

An operation of the imaging device in the operation mode M1 is first described. In the operation mode M1, the setting section 13A of the pixel driver 13 sets each of the conversion efficiencies E of all the light-receiving pixels PIX of the pixel array 11 to the high conversion efficiency HE. Each of the plurality of pixel circuits 20 (FIG. 4) in the pixel array 11 discharges the electric charge accumulated in the photodiode PD by turning on the transistor MN1 on the basis of the control signal OFG. This transistor MN1 is then turned off to start the accumulation period and an amount of electric charge corresponding to the amount of received light is accumulated in the photodiode PD. Then, after the accumulation period ends, the pixel circuit 20 performs AD conversion on the basis of the pixel signal SIG including the reset voltage Vreset and the pixel voltage Vpix. The following describes this AD conversion in detail.

FIG. 9 illustrates an operation example of the imaging device 1 in the operation mode M1. (A) illustrates the waveform of a signal XVS generated on the basis of the synchronization signal SYNC supplied from the conveyance controller 92. (B) illustrates the waveform of the control signal RST. (C) illustrates the waveform of the control signal TRG. (D) illustrates the waveform of the control signal FDG. (E) illustrates the waveform of the reference signal REF. (F) illustrates the waveform of the pixel signal SIG. (G) illustrates an operation of the counter 14. (H) illustrates the waveform of the signal CMP. (I) illustrates an operation of the readout section 15. (J) illustrates an operation of the signal processor 16.

FIGS. 9A, 9B, 9C, 9D, 9E, 9F, 9G, 9H, 9I, and 9J illustrate an operation examples of the imaging device 1 in the operation mode M1. FIG. 9A illustrates the waveform of a signal XVS generated on the basis of the synchronization signal SYNC supplied from the conveyance controller 92. FIG. 9B illustrates the waveform of the control signal RST. FIG. 9C illustrates the waveform of the control signal TRG. FIG. 9D illustrates the waveform of the control signal FDG. FIG. 9E illustrates the waveform of the reference signal REF. FIG. 9F illustrates the waveform of the pixel signal SIG. FIG. 9G illustrates an operation of the counter 14. FIG. 9H illustrates the waveform of the signal CMP. FIG. 9I illustrates an operation of the readout section 15. FIG. 9J illustrates an operation of the signal processor 16.

First, in a case where the signal XVS has a pulse at a timing t11 ((A) of FIG. 9A), the reference signal generator 12 changes the voltage of the reference signal REF to the reset voltage Vreset FIG. 9E). In addition, the pixel driver 13 changes the control signal RST and the control signal FDG from the low level to the high level at this timing t11 FIGS. 9B and 9D). This turns on each of the transistors MN3 and MN4, resets the floating diffusions FD1 and FD2, and changes the voltage of the pixel signal SIG to the reset voltage Vreset in the pixel circuit 20 ((F) of FIG. 9F). The pixel driver 13 then changes each of the control signals RST and FDG from the high level to the low level after the lapse of a predetermined time from this timing t11 FIGS. 9B and 9D). This turns off each of the transistors MN3 and MN4.

Next, the reference signal generator 12 changes the voltage of the reference signal REF to a voltage V1 from the reset voltage Vreset at a timing t12 (FIG. 9E). This causes the voltage of the reference signal REF to be higher than the voltage of the pixel signal SIG. The comparison circuit 22 thus sets the signal CMP at the high level (FIG. 9H).

Next, the pixel circuit 20 performs AD conversion on the basis of the voltage (reset voltage Vreset) of this pixel signal SIG in the period (P-phase period TP) from timings t13 to t15. Specifically, at the timing t13, the counter 14 starts an increment operation on the time code CODE (FIG. 9G) and the reference signal generator 12 starts to decrease the voltage of the reference signal REF from the voltage V1 at a predetermined change rate (FIG. 9E).

The voltage of the reference signal REF then falls below the voltage (reset voltage Vreset) of the pixel signal SIG at a timing t14 (FIGS. 9E and 9F). Accordingly, the comparison circuit 22 changes the signal CMP from the high level to the low level (FIG. 9H). The latch 23 latches the time code CODE on the basis of this transition of the signal CMP. The code value of the time code CODE latched by the latch 23 at this timing t14 is CODE1. This code value CODE1 is a code value corresponding to the length of the time from the timings t13 to t14 and a code value corresponding to the reset voltage Vreset.

The P-phase period TP then ends at the timing t15 and the counter 14 finishes the increment operation on the time code CODE (FIG. 9G). The reference signal generator 12 changes the voltage of the reference signal REF to the voltage V1 (FIG. 9E). In addition, the pixel driver 13 changes the control signal TRG from the low level to the high level at this timing t15 (FIG. 9C). This turns on the transistor MN2, transfers electric charge generated in the photodiode PD to the floating diffusion FD1, and changes the voltage of the pixel signal SIG to the pixel voltage Vpix in the pixel circuit 20 (FIG. 9E). In other words, the control signal FDG is at the low level and the transistor MN3 is therefore off. The one floating diffusion FD1 thus converts electric charge into a voltage to cause the voltage of the pixel signal SIG to be the pixel voltage Vpix. This causes the voltage of the reference signal REF to be higher than the voltage of the pixel signal SIG. The comparison circuit 22 thus changes the signal CMP from the low level to the high level (FIG. 9H). The pixel driver 13 then changes the control signal TRG from the high level to the low level after the lapse of a predetermined time from this timing t15 (FIG. 9C). This turns off the transistor MN2.

In addition, the readout section 15 supplies the code value CODE1 generated by this pixel circuit 20 to the signal processor 16 in this period from the timings t15 to t16 (FIG. 9I).

Next, the pixel circuit 20 performs AD conversion on the basis of the voltage (pixel voltage Vpix) of this pixel signal SIG in the period (D-phase period TD) from the timings t16 to t18. Specifically, at the timing t16, the counter 14 starts an increment operation on the time code CODE (FIG. 9G) and the reference signal generator 12 starts to decrease the voltage of the reference signal REF from the voltage V1 at a predetermined change rate (FIG. 9E).

The voltage of the reference signal REF then falls below the voltage (pixel voltage Vpix) of the pixel signal SIG at a timing t17 (FIGS. 9E and 9F). Accordingly, the comparison circuit 22 changes the signal CMP from the high level to the low level (FIG. 9H). The latch 23 latches the time code CODE on the basis of this transition of the signal CMP. The code value of the time code CODE latched by the latch 23 at this timing t17 is CODE2. This code value CODE2 is a code value corresponding to the length of the time from the timings t16 to t17 and a code value corresponding to the pixel voltage Vpix.T The D-phase period TD then ends at the timing t18 and the counter 14 finishes the increment operation on the time code CODE (FIG. 9G). The reference signal generator 12 sets the voltage of the reference signal REF to a voltage V2 (FIG. 9E). The readout section 15 then supplies the code value CODE2 generated by this pixel circuit 20 to the signal processor 16 in this period from the timings t18 to t19 (FIG. 9I).

The signal processor 16 then performs a CDS process in the period from the timings t19 to t22 on the basis of the code values CODE1 and CODE2 generated by each of the plurality of pixel circuits 20, thereby generating the pixel value VAL (FIG. 9J). Specifically, the signal processor 16 calculates the pixel value VAL by obtaining the difference (CODE2-CODE1) between these two code values.

In this way, the imaging device 1 calculates the pixel values VAL of the plurality of light-receiving pixels PIX of the pixel array 11. The imaging device 1 then repeats such an operation on the basis of the synchronization signal SYNC supplied from the conveyance controller 92.

The signal processor 16 then generates the image data DT by performing the TDI process illustrated in FIG. 7 on the basis of the pixel values VAL generated in this way.

(Detailed Operation in Operation Mode M2)

Next, an operation of the imaging device 1 in the operation mode M2 is described. In the operation mode M2, the setting section 13A of the pixel driver 13 sets each of the conversion efficiencies E of the plurality of light-receiving pixels PIX in the most upstream pixel line L1 to the high conversion efficiency HE. The determination section 16A of the signal processor 16 compares each of the pixel values VAL of the plurality of light-receiving pixels PIX in this pixel line L1 with the threshold TH. On the basis of a result of the comparison by the determination section 16A, the setting section 13A then sets each of the conversion efficiencies E of the plurality of light-receiving sections PIX in the plurality of pixel lines L other than the pixel line L1.

FIGS. 10A, 10B, and 10C illustrate an examples of an operation of setting the conversion efficiency E by the setting section 13A. FIG. 10A illustrates the conversion efficiency E in an accumulation period P1. FIG. 10B illustrates the conversion efficiency E in an accumulation period P2 next to the accumulation period P1. FIG. 10C illustrates the conversion efficiency E in an accumulation period P3 next to the accumulation period P2. In FIGS. 10A, 10B, and 10C, a shaded portion represents the light-receiving pixel PIX set to the low conversion efficiency LE and a white portion represents the light-receiving pixel PIX set to the high conversion efficiency HE. In addition, "○" represent the light-receiving pixel PIX that accumulates light from a bright portion of the object 9. In FIGS. 10A, 10B, and 10C, an image of the object 9 moves from top to bottom. The pixel line L disposed at the uppermost position is thus the most upstream pixel line L1.

The determination section 16A of the signal processor 16 compares each of the pixel values VAL of the plurality of light-receiving pixels PIX in the most upstream pixel line L1 obtained on the basis of a result of the accumulation in the accumulation period P1 with the threshold TH. In this example, the pixel values VAL of the three light-receiving pixels PIX (the light-receiving pixels PIX indicated by a sign W11) are larger than the threshold TH.

On the basis of a result of this comparison, the setting section 13A of the pixel driver 13 sets the conversion efficiencies E of the plurality of light-receiving pixels PIX in the second pixel line L2 in the next accumulation period P2. Specifically, the setting section 13A sets each of the conversion efficiencies E of the light-receiving pixels PIX in the pixel line L2 to the low conversion efficiency LE in the accumulation period P2. The light-receiving pixels PIX in the pixel line L2 are located downstream of the light-receiving pixels PIX in the pixel line L1 and correspond to the light-receiving pixels PIX in the pixel line L1. The light-receiving pixels PIX in the pixel line L1 have the larger pixel values VAL than the threshold TH in the accumulation period P1. In this example, the setting section 13A sets each of the conversion efficiencies E of the three light-receiving pixels PIX (the light-receiving pixels PIX indicated by a sign W12) in the pixel line L2 to the low conversion efficiency LE in the accumulation period P2. The three light-receiving pixels PIX (the light-receiving pixels PIX indicated by the sign W12) in the pixel line L2 correspond to the three light-receiving pixels PIX (the light-receiving pixels PIX indicated by the sign W11) that have the larger pixel values VAL than the threshold TH in the accumulation period P1. The positions of the three light-receiving pixels PIX indicated by the sign W11 in the pixel line L1 in the horizontal direction are the same as the positions of the three light-receiving pixels PIX indicated by the sign W12 in the pixel line L2 in the horizontal direction. In other words, the bright portion of the object 9 in the accumulation period P1 advances by the one pixel line L in the accumulation period P2. The setting section 13A therefore sets each of the conversion efficiencies E of the light-receiving pixels PIX in the pixel line L2 that correspond to the bright portion to the low conversion efficiency LE.

In addition, the determination section 16A compares each of the pixel values VAL of the plurality of light-receiving pixels PIX in the most upstream pixel line L1 obtained on the basis of a result of the accumulation in the accumulation period P2 with the threshold TH. In this example, the pixel values VAL of the three light-receiving pixels PIX (the light-receiving pixels PIX indicated by a sign W21) are larger than the threshold TH.

On the basis of a result of this comparison, the setting section 13A sets each of the conversion efficiencies E of the plurality of light-receiving pixels PIX in the second pixel line L2 in the next accumulation period P3. In this example, each of the conversion efficiencies E of the three light-receiving pixels PIX (the light-receiving pixels PIX indicated by a sign W22) in the pixel line L2 is set to the low conversion efficiency LE in the accumulation period P3. The three light-receiving pixels PIX (the light-receiving pixels PIX indicated by the sign W22) in the pixel line L2 are located downstream of the three light-receiving pixels PIX (the light-receiving pixels PIX indicated by the sign W21) that have the larger pixel values VAL than the threshold TH in the accumulation period P2.

In addition, the setting section 13A sets each of the conversion efficiencies E of the plurality of light-receiving pixels PIX in the third pixel line L3 and the plurality of subsequent pixel lines L in this accumulation period P3. Specifically, the setting section 13A sets each of the conversion efficiencies E of the light-receiving pixels PIX in the pixel line L3 to the low conversion efficiency LE in the accumulation period P3. The light-receiving pixels PIX in the pixel line L3 are located downstream of the light-receiving pixels PIX in the pixel line L2 and correspond to the light-receiving pixels PIX in the pixel line L2. The light-receiving pixels PIX in the pixel line L2 are set to the low conversion efficiency LE in the accumulation period P2. Similarly, the setting section 13A sets each of the conversion efficiencies E of the light-receiving pixels PIX in the pixel line L4 to the low conversion efficiency LE in the accumulation period P3. The light-receiving pixels PIX in the pixel line L4 are located downstream of the light-receiving pixels PIX in the pixel line L3 and correspond to the light-receiving pixels PIX in the pixel line L3. The light-receiving pixels PIX in the pixel line L3 are set to the low conversion efficiency LE in the accumulation period P2. The same applies to the light-receiving pixels PIX in the pixel line L5 and the subsequent pixel lines. In this example, the setting section 13A sets each of the conversion efficiencies E of the three light-receiving pixels PIX (the light-receiving pixels PIX indicated by a sign W13) in the pixel line L3 to the low conversion efficiency LE in the accumulation period P3. The three light-receiving pixels PIX (the light-receiving pixels PIX indicated by the sign W13) in the pixel line L3 correspond to the three light-receiving pixels PIX (the light-receiving pixels PIX indicated by the sign W12) in the pixel line L2 that are set to the low conversion efficiency LE in the accumulation period P2. The positions of the three light-receiving pixels PIX indicated by the sign W12 in the pixel line L2 in the horizontal direction are the same as the positions of the three light-receiving pixels PIX indicated by the sign W13 in the pixel line L3 in the horizontal direction. In other words, the setting section 13A sets each of the conversion efficiencies E of the three light-receiving pixels PIX (the light-receiving pixels PIX indicated by the sign W13) in the pixel line L3 to the low conversion efficiency LE in the accumulation period P3. The three light-receiving pixels PIX (the light-receiving pixels PIX indicated by the sign W13) in the pixel line L3 correspond to the three light-receiving pixels PIX (the light-receiving pixels PIX indicated by the sign W11) that have the larger pixel values VAL than the threshold TH in the accumulation period P1.

In this way, the setting section 13A sets each of the conversion efficiencies E of the light-receiving pixels PIX (the light-receiving pixels PIX indicated by "○" in FIGS. 10A, 10B, and 10C) that accumulate light from the bright portion of the object 9 to the low conversion efficiency LE (the light-receiving pixels PIX indicated by a shaded portion in FIGS. 10A, 10B, and 10C). Then, in a case where each of the conversion efficiencies E of the light-receiving pixels PIX is set to the high conversion efficiency HE, the pixel driver 13 sets the control signal FDG to be supplied to each of the light-receiving pixels PIX at the high level. In a case where each of the conversion efficiencies E of the light-receiving pixels PIX is set to the low conversion efficiency LE, the pixel driver 13 sets the control signal FDG to be supplied to each of the light-receiving pixels PIX at the low level.

FIGS. 11A, 11B, 11C, 11D, 11E, 11F, 11G, 11H, 11I, and 11J illustrate an operation examples e of the imaging device 1 in the operation mode M2. In the period from timings t41 to t51, the conversion efficiency E of the light-receiving pixel PIX is set to the high conversion efficiency HE. In the period from the timings t51 to t61, the conversion efficiency E of the light-receiving pixel PIX is set to the low conversion efficiency LE. An operation in the period from the timings t41 to t51 is similar to the operation illustrated in FIGS. 9A, 9B, 9C, 9D, 9E, 9F, 9G, 9H, 9I, and 9J. The following describes the operation in the period from the timings t51 to t61.

First, in a case where the signal XVS has a pulse at a timing t51 (FIG. 11A), the reference signal generator 12 changes the voltage of the reference signal REF to the reset voltage Vreset (FIG. 11E). In addition, the pixel driver 13 changes the control signal RST and the control signal FDG from the low level to the high level at this timing t51 (FIGS. 11B and 11D). This turns on each of the transistors MN3 and MN4, resets the floating diffusions FD1 and FD2, and changes the voltage of the pixel signal SIG to the reset voltage Vreset in the pixel circuit 20 (FIG. 11E). The pixel driver 13 then changes the control signal RST from the high level to the low level after the lapse of a predetermined time from this timing t51 (FIG. 11B). This turns off each of the transistors MN3 and MN4. In this way, in a case where the conversion efficiency E is set to the low conversion efficiency LE, the control signal FDG is kept at the high level and the transistor MN3 is kept on.

Next, the reference signal generator 12 changes the voltage of the reference signal REF to a voltage V1 from the reset voltage Vreset at a timing t52 (FIG. 11E). This causes the voltage of the reference signal REF to be higher than the voltage of the pixel signal SIG. The comparison circuit 22 thus sets the signal CMP at the high level (FIG. 11H).

Next, the pixel circuit 20 performs AD conversion on the basis of the voltage (reset voltage Vreset) of this pixel signal SIG in the period (P-phase period TP) from timings t53 to t55. Specifically, at the timing t53, the counter 14 starts an increment operation on the time code CODE (FIG. 11G) and the reference signal generator 12 starts to decrease the voltage of the reference signal REF from the voltage V1 at a predetermined change rate (FIG. 11E).

The voltage of the reference signal REF then falls below the voltage (reset voltage Vreset) of the pixel signal SIG at a timing t54 (FIGS. 11E and 11F). Accordingly, the comparison circuit 22 changes the signal CMP from the high level to the low level (FIG. 11H). The latch 23 latches the time code CODE on the basis of this transition of the signal CMP. The code value of the time code CODE latched by the latch 23 at this timing t54 is CODE1.

The P-phase period TP then ends at the timing t55 and the counter 14 finishes the increment operation on the time code CODE (FIG. 11G). The reference signal generator 12 changes the voltage of the reference signal REF to the voltage V1 (FIG. 11E). In addition, the pixel driver 13 changes the control signal TRG from the low level to the high level at this timing t55 (FIG. 11C). This turns on the transistor MN2, transfers electric charge generated in the photodiode PD to the two floating diffusions FD1 and FD2, and changes the voltage of the pixel signal SIG to the pixel voltage Vpix in the pixel circuit 20 (FIG. 11E). In other words, the control signal FDG is at the high level and the transistor MN3 is therefore on. Each of the two floating diffusions FD1 and FD2 thus converts electric charge into a voltage to cause the voltage of the pixel signal SIG to be the pixel voltage Vpix. This causes the voltage of the reference signal REF to be higher than the voltage of the pixel signal SIG. The comparison circuit 22 thus changes the signal CMP from the low level to the high level (FIG. 11H). The pixel driver 13 then changes the control signal TRG from the high level to the low level after the lapse of a predetermined time from this timing t55 (FIG. 11C). This turns off the transistor MN2.

In addition, the readout section 15 supplies the code value CODE1 generated by this pixel circuit 20 to the signal processor 16 in this period from the timings t55 to t56 (FIG. 11I).

Next, the pixel circuit 20 performs AD conversion on the basis of the voltage (pixel voltage Vpix) of this pixel signal SIG in the period (D-phase period TD) from the timings t56 to t58. Specifically, at the timing t56, the counter 14 starts an increment operation on the time code CODE (FIG. 11G) and the reference signal generator 12 starts to decrease the voltage of the reference signal REF from the voltage V1 at a predetermined change rate (FIG. 11E).

The voltage of the reference signal REF then falls below the voltage (pixel voltage Vpix) of the pixel signal SIG at a timing t57 (FIGS. 11E and 11F). Accordingly, the comparison circuit 22 changes the signal CMP from the high level to the low level (FIG. 11H). The latch 23 latches the time code CODE on the basis of this transition of the signal CMP. The code value of the time code CODE latched by the latch 23 at this timing t57 is CODE2.

The D-phase period TD then ends at the timing t58 and the counter 14 finishes the increment operation on the time code CODE (FIG. 11G). The reference signal generator 12 sets the voltage of the reference signal REF to the voltage V2 (FIG. 11E). In addition, the pixel driver 13 changes the control signal FDG from the high level to the low level (FIG. 11B). This turns off the transistor MN3. The readout section 15 then supplies the code value CODE2 generated by this pixel circuit 20 to the signal processor 16 in this period from the timings t58 to t59 (FIG. 11I).

The signal processor 16 then performs a CDS process in the period from the timing t59 to a subsequent timing on the basis of the code values CODE1 and CODE2 generated by each of the plurality of pixel circuits 20, thereby generating the pixel value VAL (FIG. 11J).

The pixel value VAL calculated in this way is a value corresponding to the conversion efficiency E as illustrated in FIG. 5. The signal processor 16 thus corrects the pixel value VAL.

FIG. 12 illustrates an example of a correction process on the pixel value VAL. The threshold TH is a threshold of the pixel value VAL and a threshold TH2 is a threshold of the amount of received light corresponding to the threshold of the pixel value VAL. As described above, the determination section 16A of the signal processor 16 compares each of the pixel values VAL of the plurality of light-receiving pixels PIX in the most upstream pixel line L1 obtained on the basis of a result of the accumulation in a certain accumulation period with the threshold TH. On the basis of a result of this comparison, the setting section 13A of the pixel driver 13 then sets each of the conversion efficiencies E of the plurality of light-receiving pixels PIX in the second pixel line L2 in the next accumulation period.

For example, in a case where the pixel value VAL of the certain light-receiving pixel PIX in the pixel line L1 is smaller than the threshold TH in a certain accumulation period, the setting section 13A of the pixel driver 13 sets the conversion efficiency E of the light-receiving pixel PIX in the pixel line L2 corresponding to the light-receiving pixel PIX in the pixel line L1 to the high conversion efficiency HE in the next accumulation period. The pixel value VAL of the light-receiving pixel PIX in the pixel line L2 is thus positioned on a characteristic line of the high conversion efficiency HE and the amount of received light is smaller than the threshold TH2 as illustrated in FIG. 12. In other words, the conversion efficiency E of the light-receiving pixel PIX in the most upstream pixel line L1 is set to the high conversion efficiency HE. The light-receiving pixel PIX in this pixel line L1 having the smaller pixel value VAL than the threshold TH in a certain accumulation period thus means that the amount of light received by the light-receiving pixel PIX is smaller than the threshold TH2. Thus, the amount of light received by the light-receiving pixel PIX in the pixel line L2 corresponding to the light-receiving pixel PIX in the pixel line L1 in the next accumulation period is also smaller than the threshold TH2.

In addition, for example, in a case where the pixel value VAL of the certain light-receiving pixel PIX in the pixel line L1 is larger than the threshold TH in a certain accumulation period, the setting section 13A of the pixel driver 13 sets the conversion efficiency E of the light-receiving pixel PIX in the pixel line L2 corresponding to the light-receiving pixel PIX in the pixel line L1 to the low conversion efficiency LE in the next accumulation period. The pixel value VAL of the light-receiving pixel PIX in the pixel line L2 is thus positioned on a characteristic line of the low conversion efficiency LE and the amount of received light is larger than the threshold TH2 as illustrated in FIG. 12. In other words, the conversion efficiency E of the light-receiving pixel PIX in the most upstream pixel line L1 is set to the high conversion efficiency HE. The light-receiving pixel PIX in this pixel line L1 having the larger pixel value VAL than the threshold TH in a certain accumulation period thus means that the amount of light received by the light-receiving pixel PIX is larger than the threshold TH2. Thus, the amount of light received by the light-receiving pixel PIX in the pixel line L2 corresponding to the light-receiving pixel PIX in the pixel line L1 in the next accumulation period is also larger than the threshold TH2.

The signal processor 16 corrects the pixel value VAL by multiplying the pixel value VAL of the light-receiving pixel PIX having the conversion efficiency E set to the low conversion efficiency LE by a coefficient K as illustrated in FIG. 12. This causes the corrected pixel value VAL to be positioned on the characteristic line of the high conversion efficiency HE. In other words, whether the conversion efficiency E of the light-receiving pixel PIX is set to the high conversion efficiency HE or the low conversion efficiency LE, the pixel value VAL obtained on the basis of a result of the accumulation in that light-receiving pixel PIX is positioned on the characteristic line of the high conversion efficiency HE.

In this way, the imaging device 1 calculates the pixel values VAL of the plurality of light-receiving pixels PIX in the pixel array 11. The imaging device 1 then repeats such an operation on the basis of the synchronization signal SYNC supplied from the conveyance controller 92.

The signal processor 16 then generates the image data DT by performing the TDI process illustrated in FIG. 8 on the basis of the pixel values VAL generated in this way.

FIG. 13 illustrates an operation of the imaging device 1 in the operation mode M2.

First, the light-receiving pixel PIX in the pixel line L1 that has the conversion efficiency E set to the high conversion efficiency HE generates the code values CODE1 and CODE2 (step S101). Specifically, as illustrated in FIGS. 11A, 11B, 11C, 11D, 11E, 11F, 11G, 11H, 11I, and 11J, the light-receiving pixel PIX latches the time code CODE on the basis of the transition of the signal CMP to generate the code value CODE1 in the P-phase period TP and latches the time code CODE on the basis of the transition of the signal CMP to generate the code value CODE2 in the D-phase period TD.

Next, the signal processor 16 generates the pixel value VAL by performing a CDS process on the basis of the code values CODE1 and CODE2 generated in step S101 (step S102). Specifically, the imaging device 1 generates the pixel value VAL by obtaining the difference (CODE2−CODE1) between these two code values.

Next, the determination section 16A of the signal processor 16 checks whether or not the pixel value VAL generated in step S102 is larger than the threshold TH (step S103).

In a case where the pixel value VAL is larger than the threshold TH in step S103 ("Y" in step S103), the setting section 13A of the pixel driver 13 sets the conversion efficiency E of the light-receiving pixel PIX in the pixel line L2 to the low conversion efficiency LE (step S104). The light-receiving pixel PIX in the pixel line L2 is located downstream of the light-receiving pixel PIX in the pixel line L1 and corresponds to the light-receiving pixel PIX in the pixel line L1. The light-receiving pixel PIX in the pixel line L2 that has the conversion efficiency E set to the low conversion efficiency LE then generates the code values CODE1 and CODE2 (step S105) and the signal processor 16 generates the pixel value VAL by performing a CDS process on the basis of these code values CODE1 and CODE2 (step S106).

The signal processor 16 then corrects the pixel value VAL by multiplying the pixel value VAL generated in step S106 by the coefficient K (step S107). Thus, this flow ends.

In a case where the pixel value VAL is smaller than the threshold TH in step S103 ("N" in step S103), the setting section 13A of the pixel driver 13 sets the conversion efficiency E of the light-receiving pixel PIX in the pixel line L2 to the high conversion efficiency HE (step S108). The light-receiving pixel PIX in the pixel line L2 is located downstream of the light-receiving pixel PIX in the pixel line L1 and corresponds to the light-receiving pixel PIX in the pixel line L1. The light-receiving pixel PIX in the pixel line L2 that has the conversion efficiency E set to the high conversion efficiency HE then generates the code values CODE1 and CODE2 (step S109) and the signal processor 16 generates the pixel value VAL by performing a CDS process on the basis of these code values CODE1 and CODE2 (step S110). Thus, this flow ends.

In this way, the imaging device 1 is provided with the pixel array 11 including the plurality of light-receiving pixels PIX that each accumulates electric charge corresponding to the amount of received light and each has the conversion efficiency E (light-receiving sensitivity) which is variable. For example, in a case where the imaging device 1 images a bright portion of the object 9, this allows the imaging device 1 to image the bright portion at high image quality by setting the conversion efficiency E of the light-receiving pixel PIX that images the bright portion to the low conversion efficiency LE. In addition, in a case where the imaging device 1 images a dark portion of the object 9, the imaging device 1 is able to image the dark portion at high image quality by setting the conversion efficiency E of the light-receiving pixel PIX that images the dark portion to the high conversion efficiency HE. As a result, the imaging device 1 is allowed to have a widened dynamic range.

In addition, in the imaging device 1, the plurality of light-receiving pixels PIX is divided into the plurality of pixel lines L including the first pixel line L1 and the second pixel line L2. The first pixel line L1 and the second pixel line L2 extend in the first direction and are disposed side by side in the second direction. The conversion efficiency E of the light-receiving pixel PIX disposed at a first position in the second pixel line L2 in the first direction is then set on the basis of the pixel value VAL corresponding to a result of accumulation in the light-receiving pixel PIX disposed at the first position in the first pixel line L1 in the first direction. This makes it possible to simplify the circuit configuration. In other words, in a case where the light-receiving pixel PIX sets the conversion efficiency E of that light-receiving pixel PIX on the basis of a result of the accumulation of electric charge in that light-receiving pixel PIX, for example, as with the technology described in PTL 1, the light-receiving pixel PIX may have a complicated circuit configuration. In addition, it is necessary to perform an operation for setting the conversion efficiency E on the basis of a result of the accumulation of electric charge and the imaging interval may be thus longer. In contrast, in the imaging device 1 according to the present embodiment, the conversion efficiency E of the light-receiving pixel PIX in the second pixel line L2 is set on the basis of the pixel value VAL corresponding to a result of accumulation in the light-receiving pixel PIX in the first pixel line L1. This makes it possible to reduce the possibility that the light-receiving pixel PIX has a complicated circuit configuration. In addition, for example, on the basis of the pixel value VAL corresponding to a result of accumulation in a certain accumulation period, the conversion efficiency E in the next accumulation period is set. This makes it possible to reduce the possibility that the imaging interval is longer. In this way, it is possible in the imaging device 1 to widen the dynamic range while reducing the possibility that the light-receiving pixel PIX has a complicated circuit configuration or the imaging interval is longer. This makes it possible to effectively widen the dynamic range.

In addition, in the imaging device 1, the conversion efficiency E of the second light-receiving pixel PIX disposed at the first position in the second pixel line L2 in the first direction in a first period and the conversion efficiency E of the third light-receiving pixel PIX disposed at the first position in the third pixel line L3 in the first direction in a second period subsequent to the first period are set on the basis of the pixel value VAL corresponding to a result of accumulation in the first light-receiving pixel PIX disposed at the first position in the first pixel line L1 in the first direction. The pixel value VAL corresponding to a result of accumulation in the second light-receiving pixel PIX and the pixel value VAL corresponding to a result of accumulation in the third light-receiving pixel PIX are then added to generate the image data DT. The imaging device 1 allows a captured image to have higher sensitivity by performing a TDI process in this way. This makes it possible to effectively widen the dynamic range.

[Effects]

As described above, in the present embodiment, there is provided a pixel array including a plurality of light-receiving pixels that each accumulates electric charge corresponding to the amount of received light and each has conversion efficiency which is variable. The plurality of light-receiving pixels is divided into a plurality of pixel lines including a first pixel line and a second pixel line. The first pixel line and the second pixel line extend in the first direction and are disposed side by side in the second direction. The conversion efficiency of the light-receiving pixel disposed at a first position in the second pixel line in a first direction is then set on the basis of the pixel value corresponding to a result of accumulation in the light-receiving pixel disposed at the first position in the first pixel line in the first direction. This makes it possible to widen the dynamic range.

In the present embodiment, the conversion efficiency of the second light-receiving pixel PIX disposed at the first position in the second pixel line in the first direction in a first period and the conversion efficiency of the third light-receiving pixel disposed at the first position in the third pixel line in the first direction in a second period subsequent to the first period are set on the basis of the pixel value corresponding to a result of accumulation in the first light-receiving pixel disposed at the first position in the first pixel line in the first direction. The pixel value corresponding to a result of accumulation in the second light-receiving pixel and the pixel value corresponding to a result of accumulation in the third light-receiving pixel are then added to generate image data. This makes it possible to widen the dynamic range.

Modification Example 1

In the embodiment described above, the two conversion efficiencies E (the high conversion efficiency HE and the low conversion efficiency LE) are provided and the conversion efficiency E of the light-receiving pixel PIX is set to one of these two conversion efficiencies E. This is not, however, limitative. Instead of this, for example, three or more conversion efficiencies E may be provided and the conversion efficiency E of the light-receiving pixel PIX may be set to one of these three or more conversion efficiencies E.

Modification Example 2

In the embodiment described above, on the basis of the pixel values VAL of the one pixel line L1, the conversion efficiencies E of the plurality of light-receiving pixels PIX in the plurality of pixel lines L other than the pixel line L1 are set in the operation mode M2. This is not, however, limitative. Instead of this, for example, on the basis of the pixel values VAL of the two pixel lines L1 and L2, the conversion efficiencies E the plurality of light-receiving pixels PIX in the plurality of pixel lines L other than the pixel lines L1 and L2 may be set. In this case, for example, the setting section 13A of the pixel driver 13 sets each of the conversion efficiencies E of the plurality of light-receiving pixels PIX in the pixel lines L1 and L2 to the high conversion efficiency HE. The setting section 16A then adds the pixel values of the plurality of light-receiving pixels PIX in the pixel line L1 and the pixel values of the plurality of light-receiving pixels PIX in the pixel line L2 by using a TDI process and compares each of the values resulting from the addition and the threshold TH. On the basis of a result of this comparison, the setting section 13A then sets each of the conversion efficiencies E of the plurality of light-receiving sections PIX in the plurality of pixel lines L other than the pixel lines L1 and L2.

Modification Example 3

In the embodiment described above, the light-receiving pixel PIX performs the accumulation operation and the AD conversion operation, but this is not limitative. Instead of this, for example, a circuit that performs the AD conversion operation may be provided separately from the light-receiving pixel. The following describes an imaging device 2 according to the present modification example in detail.

FIG. 14 illustrates a configuration example of the imaging device 2. The imaging device 2 includes the pixel array 11, the reference signal generator 12, a pixel driver 113, a readout section 115, a signal processor 116, and the input/output section 17.

A pixel array 111 includes a plurality of light-receiving pixels PIX2 disposed in a matrix. The plurality of light-receiving pixels PIX2 is divided into the plurality of pixel lines L. Each of the light-receiving pixels PIX2 performs an accumulation operation of accumulating the electric charge corresponding to the amount of received light in the accumulation period. In other words, the light-receiving pixel PIX according to the embodiment described above performs the accumulation operation and the AD conversion operation, but the light-receiving pixel PIX2 according to the present modification example performs only the accumulation operation. The light-receiving pixel PIX2 then supplies the pixel signal SIG including the reset voltage Vreset and the pixel voltage Vpix to the readout section 115.

The pixel driver 113 is configured to control an operation of each of the plurality of light-receiving pixels PIX2. The pixel driver 113 includes the setting section 13A as with the pixel driver 13 according to the embodiment described above.

The readout section 115 is configured to generate the code values CODE1 and CODE2 by performing AD conversion on the basis of the pixel signal SIG supplied from each of the plurality of light-receiving pixels PIX2. The readout section 15 includes, for example, a plurality of AD conversion circuits corresponding to a plurality of columns in the pixel array 111. The plurality of respective AD conversion circuits performs AD conversion on the basis of the pixel signals SIG supplied from the plurality of light-receiving pixels PIX2 belonging to the corresponding columns in a time-division manner.

The signal processor 116 is configured to generate the image data DT by performing predetermined image processing on the basis of the code values CODE1 and CODE2 generated by the readout section 115.

Other Modification Examples

In addition, two or more of these modification examples may be combined.

Although the present technology has been described above with reference to the embodiment and the modification examples, the present technology is not limited to this embodiment or the like. A variety of modifications are possible.

For example, in the embodiment described above, the imaging device 1 performs an imaging operation on the basis of the synchronization signal SYNC whenever an image of the object 9 advances on the imaging surface S by the one pixel line L, but this is not limitative. Instead of this, for example, the imaging device may perform an imaging operation whenever an image of the object 9 advances on the imaging surface S by the two or more pixel lines L.

It is to be noted that the effects described in this specification are merely illustrative, but not limited. In addition, other effects may be included.

It is to be noted that the present technology may be configured as follows. The present technology having the following configurations makes it possible to widen the dynamic range.

(1)
An imaging device including:
a pixel array including a plurality of light-receiving pixels that is divided into a plurality of pixel lines, the plurality of pixel lines including a first pixel line and a second pixel line that extend in a first direction and are provided side by side in a second direction, the plurality of light-receiving pixels each accumulating electric charge corresponding to an amount of received light and each having light-receiving sensitivity which is variable; and
a sensitivity setting section that sets the light-receiving sensitivity of a second light-receiving pixel in a first period on the basis of a first pixel value corresponding to a result of accumulation in a first light-receiving pixel disposed at a first position in the first pixel line in the first direction, the second light-receiving pixel being disposed at the first position in the second pixel line in the first direction.

(2)
The imaging device according to (1), in which the sensitivity setting section
sets the light-receiving sensitivity of the second light-receiving pixel to predetermined sensitivity in a case where the first pixel value is smaller than the predetermined threshold, and
sets the light-receiving sensitivity of the second light-receiving pixel to sensitivity lower than the predetermined sensitivity in a case where the first pixel value is larger than the predetermined threshold.

(3)
The imaging device according to (1) or (2), further including a signal processor that corrects a second pixel value by multiplying the second pixel value by a coefficient corresponding to the light-receiving sensitivity of the second light-receiving pixel, the second pixel value corresponding to a result of accumulation in the second light-receiving pixel.

(4)

The imaging device according to (1) or (2), in which
the plurality of pixel lines further includes a third pixel line,
the second pixel line is provided between the first pixel line and the third pixel line in the second direction, and
the sensitivity setting section sets the light-receiving sensitivity of a third light-receiving pixel in a second period subsequent to the first period on the basis of the first pixel value, the third light-receiving pixel being disposed at the first position in the third pixel line in the first direction.

(5)

The imaging device according to (4), further including a signal processor that generates image data by adding a second pixel value and a third pixel value, the second pixel value corresponding to a result of accumulation in the second light-receiving pixel, the third pixel value corresponding to a result of accumulation in the third light-receiving pixel.

(6)

The imaging device according to any of (1) to (5), in which
the imaging device has a first operation mode and a second operation mode, and
the sensitivity setting section
sets the light-receiving sensitivity of each of the plurality of light-receiving pixels to predetermined sensitivity in the first operation mode, and
sets the light-receiving sensitivity of each of a plurality of light-receiving pixels in the first pixel line to the predetermined sensitivity and sets the light-receiving sensitivity of the second light-receiving pixel in the first period on the basis of the first pixel value in the second operation mode.

(7)

The imaging device according to any of (1) to (6), in which the first pixel line is disposed at an end of the pixel array.

(8)

The imaging device according to any of (1) to (7), in which the imaging device performs an imaging operation whenever an image of an object advances on an imaging surface of the pixel array by a predetermined number of pixel lines in the second direction.

This application claims the priority on the basis of Japanese Patent Application No. 2020-108112 filed on Jun. 23, 2020 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging device, comprising:
a pixel array that includes:
a plurality of light-receiving pixels in a plurality of pixel lines, wherein the plurality of pixel lines includes:
a first pixel line that comprises a first set of light-receiving pixels of the plurality of light-receiving pixels, wherein the first set of light-receiving pixels is configured to:
receive a first amount of light;
accumulate a first electric charge based on the received first amount of light; and
generate a first pixel value based on the accumulated first electric charge; and
a second pixel line that comprises a second set of light-receiving pixels, wherein
the second set of light-receiving pixels is configured to:
receive a second amount of light; and
accumulate a second electric charge based on the received second amount of light and,
each of the first pixel line and the second pixel line extends in a first direction,
the first pixel line is adjacent to the second pixel line in a second direction,
the first set of light-receiving pixels is associated with a first light-receiving sensitivity,
the second set of light-receiving pixels is associated with a second light-receiving sensitivity, and
each of the first light-receiving sensitivity and the second light-receiving sensitivity is variable;
a sensitivity setting section configured to:
set, in a first period, the second light-receiving sensitivity based on the first pixel value; and
determine a second pixel value based on the second light-receiving sensitivity and the second electric charge, wherein
the first pixel value is different from the second pixel value, and
the first pixel value corresponds to a result of the accumulation of the first electric charge; and
a signal processor configured to generate image data based on the first pixel value and the second pixel value.

2. The imaging device according to claim 1, wherein the sensitivity setting section is further configured to:
set the second light-receiving sensitivity to a third light-receiving sensitivity based on the first pixel value is smaller than a specific threshold; and
set the second light-receiving sensitivity to a fourth light-receiving sensitivity based on the first pixel value is larger than the specific threshold,
wherein the fourth light-receiving sensitivity is lower than the third light-receiving sensitivity.

3. The imaging device according to claim 1, wherein the signal processor is further configured to:
multiply the second pixel value with a coefficient that corresponds to the second light-receiving sensitivity; and
correct the second pixel value based on the multiplication of the second pixel value with the coefficient, wherein the second pixel value corresponds to a result of the accumulation of the second electric charge.

4. The imaging device according to claim 1, wherein
the plurality of pixel lines further includes a third pixel line,
the third pixel line includes a third set of light-receiving pixels, wherein the third set of light-receiving pixels is configured to:
receive a third amount of light; and
accumulate a third electric charge based on the third amount of light,
the third set of light-receiving pixels is associated with a third light-receiving sensitivity,
the third light-receiving sensitivity is variable,
the second pixel line is provided between the first pixel line and the third pixel line, in the second direction,
the sensitivity setting section is further configured to:

set, in a second period, the third light-receiving sensitivity based on the first pixel value; and
determine a third pixel value based on the third light-receiving sensitivity and the accumulation of the third electric charge,
each of the first pixel value, the second pixel value, and the third pixel value is different, and
the second period is after the first period.

5. The imaging device according to claim 4, wherein the signal processor is further configured to:
add the second pixel value and the third pixel value; and
generate the image data based on the addition of the second pixel value and the third pixel value, wherein
the second pixel value corresponds to a result of the accumulation of the second electric charge, and
the third pixel value corresponds to a result of the accumulation of the third electric charge.

6. The imaging device according to claim 1, wherein
the imaging device is in one of a first operation mode or a second operation mode, and
the sensitivity setting section is further configured to:
in the first operation mode, set each of the first light-receiving sensitivity and the second light-receiving sensitivity to a specific light-receiving sensitivity;
in the second operation mode, set the first light-receiving sensitivity to the specific light-receiving sensitivity; and
in the second operation mode, set the second light-receiving sensitivity in the first period based on the first pixel value.

7. The imaging device according to claim 1, wherein the first pixel line is at an end of the pixel array.

8. The imaging device according to claim 1, wherein
the imaging device is configured to perform an imaging operation based on a movement of an image of an object,
the movement of the image is on an imaging surface of the pixel array, and
the movement of the image corresponds to a specific number of pixel lines in the second direction.

* * * * *